US012479210B2

(12) United States Patent
Fukasawa

(10) Patent No.: US 12,479,210 B2
(45) Date of Patent: Nov. 25, 2025

(54) PRINTING MATERIAL CARTRIDGE WITH IDENTIFICATION PORTION READABLE BY PRINTING APPARATUS AND PRINTING SYSTEM

(71) Applicant: SEIKO EPSON CORPORATION, Tokyo (JP)

(72) Inventor: Noriyuki Fukasawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 176 days.

(21) Appl. No.: 18/387,106

(22) Filed: Nov. 6, 2023

(65) Prior Publication Data

US 2024/0149590 A1 May 9, 2024

(30) Foreign Application Priority Data

Nov. 7, 2022 (JP) ................................ 2022-178159
Jul. 4, 2023 (JP) ................................ 2023-109818

(51) Int. Cl.

*B41J 2/175* (2006.01)
*B41J 2/21* (2006.01)
*B41J 2/44* (2006.01)

(52) U.S. Cl.

CPC ......... *B41J 2/17523* (2013.01); *B41J 2/2121* (2013.01); *B41J 2/442* (2013.01); *B41J 2203/01* (2020.08)

(58) Field of Classification Search

CPC ...... B41J 2/17523; B41J 2/2121; B41J 2/442; B41J 2203/01; B41J 2/17546; B41J 2/17553

See application file for complete search history.

(56) References Cited

U.S. PATENT DOCUMENTS 9,996,031 B2 * 6/2018 Luke ...................... B41J 2/1755
11,198,298 B2 12/2021 Aoki et al.
2011/0238704 A1 * 9/2011 Koike .................... G06Q 10/08 707/802

FOREIGN PATENT DOCUMENTS

WO 2019/098287 A1 5/2019

* cited by examiner

*Primary Examiner* — Bradley W Thies
(74) *Attorney, Agent, or Firm* — Oliff PLC

(57) ABSTRACT

A printing material cartridge mounted by being inserted into a cartridge mounting portion of a printing apparatus, includes: an identification portion on which identification information for identifying the printing material cartridge is recorded, in which the identification portion is formed at a readable position that is optically readable by a reading portion formed inside a cartridge mounting portion of the printing apparatus in an insertion process of inserting the printing material cartridge into the cartridge mounting portion.

9 Claims, 18 Drawing Sheets

830

| CARTRIDGE ID | CONSUMPTION VALUE (%) | READING FREQUENCY | READING TIMING |
|---|---|---|---|
| BK-1001 | 70 | 1 | 6/1/20XX 15:04:25 |
| BK-1002 | 20 | 3 | 9/3/20XX 11:51:03 |
| ⋮ | ⋮ | ⋮ | ⋮ |

PRINTING MATERIAL CARTRIDGE WITH IDENTIFICATION PORTION READABLE BY PRINTING APPARATUS AND PRINTING SYSTEM

The present application is based on, and claims priority from JP Application Serial Number 2022-178159, filed Nov. 7, 2022, and JP Application Serial Number 2023-109818, filed Jul. 4, 2023, the disclosures of which are hereby incorporated by reference herein in their entirety.

BACKGROUND

1. Technical Field

The present disclosure relates to technologies of a printing material cartridge and a printing system.

2. Related Art

In the related art, in a cartridge that is detachably mounted in a mounting portion of a liquid ejecting apparatus, a configuration in which a circuit substrate is disposed in a case forming an outer covering of the cartridge, and a sheet-shaped cover member is attached to a surface of the case is known (International Publication No. 2019/098287).

Since the circuit substrate is attached to the outer covering of the cartridge, the circuit substrate may not be easily removed when reusing the used cartridge. Accordingly, the cartridge may not be easily reused.

SUMMARY (1) According to an aspect of the present disclosure, there is provided a printing material cartridge. The printing material cartridge mounted by being inserted into a cartridge mounting portion of a printing apparatus, includes: an identification portion on which identification information for identifying the printing material cartridge is recorded, in which the identification portion is formed at a readable position that is optically readable by a reading portion formed inside the cartridge mounting portion of the printing apparatus in an insertion process of inserting the printing material cartridge into the cartridge mounting portion.

(2) According to another aspect of the present disclosure, there is provided a printing system. The printing system includes: the printing material cartridge according to the above aspect; and a printing apparatus, in which the printing apparatus includes a cartridge mounting portion in which the printing material cartridge is mounted by inserting the printing material cartridge, and a notification portion that notifies that mounting of the printing material cartridge in the cartridge mounting portion is completed, the printing material cartridge has a protruding portion extending in an insertion direction of the printing material cartridge with respect to the cartridge mounting portion, the cartridge mounting portion has a movable portion, the movable portion is pushed by the protruding portion in the insertion process, and the notification portion notifies that the mounting of the printing material cartridge in the cartridge mounting portion is completed when a movement amount of the movable portion is equal to or more than a predetermined threshold.

DESCRIPTION OF EMBODIMENTS

A. First Embodiment

Figure 1:
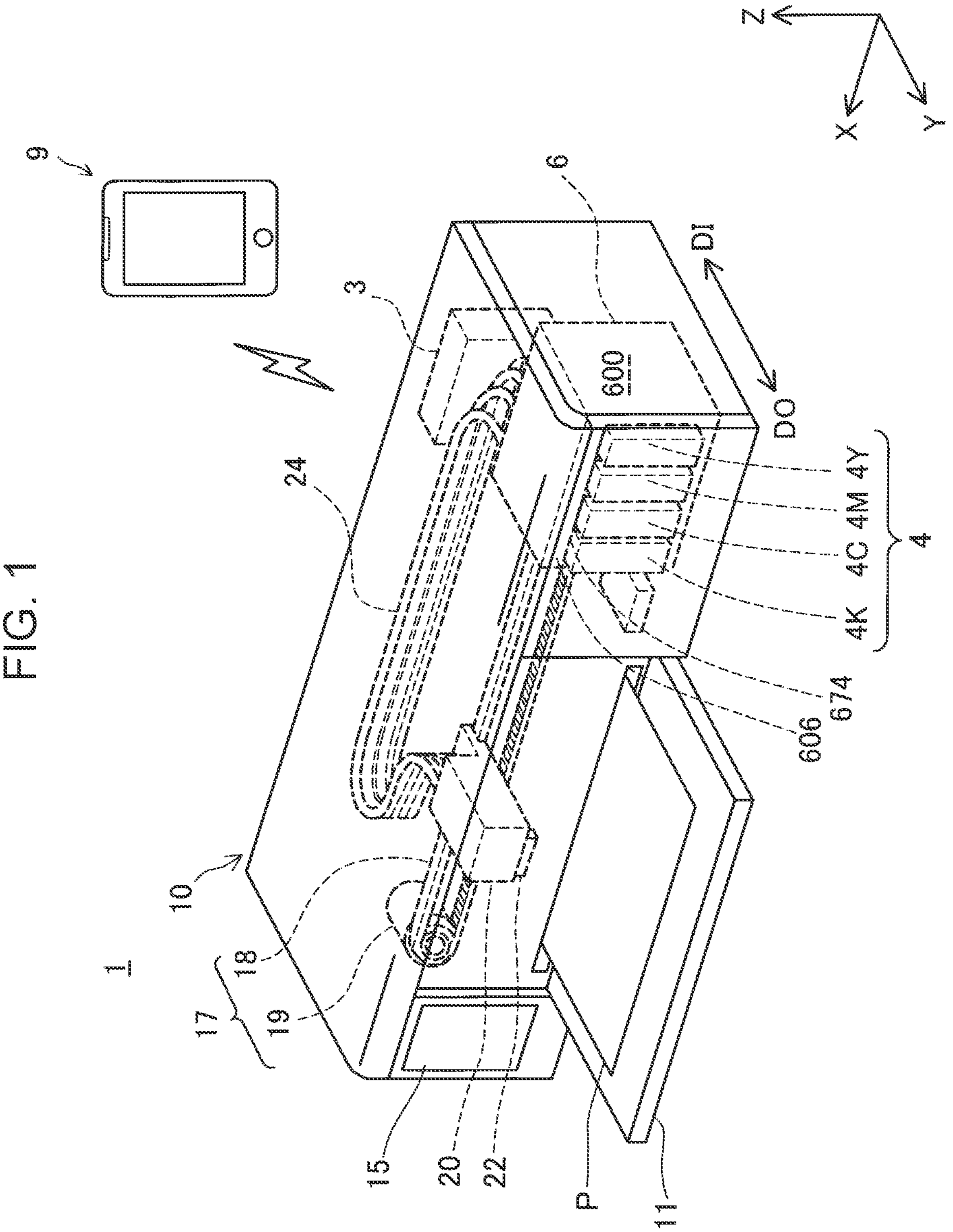
FIG. 1 is a view illustrating a schematic configuration of a printing system.

A-1. Configuration of Printing Apparatus:

FIG. 1 is a view illustrating a schematic configuration of a printing system 1. FIG. 1 illustrates XYZ axes which are three spatial axes orthogonal to each other. Directions in which arrows of the X-axis, the Y-axis, and the Z-axis are directed indicate positive directions along the X-axis, the Y-axis, and the Z-axis, respectively. The positive directions along the X-axis, the Y-axis, and the Z-axis are referred to as a +X direction, a +Y direction, and a +Z direction, respectively. Directions opposite to the directions in which the arrows of the X-axis, the Y-axis, and the Z-axis are directed indicate negative directions along the X-axis, the Y-axis, and the Z-axis, respectively. The negative directions along the X-axis, the Y-axis, and the Z-axis are referred to as a −X direction, a −Y direction, and a −Z direction, respectively. When positiveness and negativeness in the directions along the X-axis, the Y-axis, and the Z-axis do not matter, the directions may be referred to as an X direction, a Y direction, and a Z direction, respectively.

In the present embodiment, in a use state of the printing system 1, the X-axis and the Y-axis are axes along a horizontal plane, and the Z-axis is an axis along a gravity direction. That is, the use state of the printing system 1 is a state in which the printing system 1 is installed on a horizontal surface. Hereinafter, the gravity direction is referred to as the −Z direction, and an antigravity direction is defined as the +Z direction. A direction from a front surface side to a rear surface side of the printing system 1 is referred to as the −Y direction, and a direction from a rear surface side to a front surface side of the printing system 1 is referred to as the +Y direction. In addition, when the printing system 1 is viewed from a −Y direction side, which is the front surface side, a direction from a right surface side to a left surface side of the printing system 1 is referred to as the +X direction, and a direction from the left surface side to the right surface side is referred to as the −X direction. The same applies to the following drawings and descriptions.

The printing system 1 includes a printing apparatus 10 and a printing material cartridge 4 accommodating a printing material supplied to the printing apparatus 10. The printing material cartridge 4 has an identification portion as image information in which identification information for identifying the printing material cartridge 4 is recorded. In the present embodiment, the identification portion is a QR code (registered trademark, hereinafter omitted) which is an example of a matrix type two-dimensional code.

The printing apparatus 10 is an apparatus that prints an image, text, or the like by discharging the printing material onto a medium P such as printing paper, a resin film, or fabric. In the present embodiment, the printing apparatus 10 is an ink jet printer that discharges ink as the printing material from a head 22. The ink may be any of various liquid compositions such as a water-based ink, an oil-based ink, a gel ink, and a hot melt ink. In addition, the printing material is not limited to a liquid, and may be a toner in a form of powder.

The printing apparatus 10 includes a cartridge mounting portion 6 for mounting the printing material cartridge 4, a main control device 3, a drive mechanism 17, a carriage 20, and the head 22 provided with nozzles for discharging the printing material supplied from the printing material cartridge 4.

The printing material cartridge 4 is detachably mounted in the cartridge mounting portion 6. The cartridge mounting portion 6 has an apparatus front wall 606 positioned on a +Y direction side. The apparatus front wall 606 has an insertion/removal opening 674, which is an entrance/exit of the printing material cartridge 4 to an accommodation chamber 600. The printing material cartridge 4 is mounted by being inserted into the accommodation chamber 600 of the cartridge mounting portion 6 via the insertion/removal opening 674. In the present embodiment, an insertion direction DI of the printing material cartridge 4 with respect to the cartridge mounting portion 6 is the −Y direction from a front surface side to a rear surface side of the printing apparatus 10. In addition, a removal direction DO of the printing material cartridge 4 mounted in the cartridge mounting portion 6 is the +Y direction opposite to the insertion direction DI. Furthermore, in the present embodiment, four types of printing material cartridges 4 respectively corresponding to four colors of ink, black, cyan, magenta, and yellow, are provided, that is, a total of four printing material cartridges 4K, 4C, 4M, and 4Y are each mounted in the cartridge mounting portion 6. An arrangement direction of a plurality of the printing material cartridges 4K, 4C, 4M, and 4Y is the X direction in which a right surface and a left surface of the printing apparatus 10 face each other. The type, number, and disposition of the printing material cartridges 4 mounted in the cartridge mounting portion 6 are not limited thereto.

In a mounting completed state in which mounting of the printing material cartridge 4 in the cartridge mounting portion 6 is completed, the ink as the printing material is supplied to the head 22 provided in the carriage 20 via a tube 24 as a liquid circulation tube. In addition, the tube 24 is provided for each type of ink. In the present embodiment, a pressurized fluid is introduced into the printing material cartridge 4 from the printing apparatus 10, so that the ink is supplied to the head 22 from a liquid accommodation bag (not illustrated) of the printing material cartridge 4. A method of supplying the ink from the printing material cartridge 4 to the head 22 is not limited thereto. The ink may be supplied to the head 22 by being suctioned from an inside of the printing material cartridge 4 by, for example, a pump mechanism of the printing apparatus 10.

The head 22 is provided with the nozzles for each type of ink. The ink is ejected from the nozzles toward the medium P. In the present embodiment, the printing apparatus 10 is a so-called "off-carriage type" printer in which the cartridge mounting portion 6 is not linked to a movement of the carriage 20. The technologies of the present disclosure are also applicable to a so-called "on-carriage type" printer in which the cartridge mounting portion 6 is provided in the carriage 20 and the cartridge mounting portion 6 moves together with the carriage 20.

The main control device 3 controls an operation of each portion of the printing apparatus 10, exchanges a signal with the printing material cartridge 4, and exchanges a signal with a portable terminal 9 carried by a user or the like. Details of functions of the main control device 3 will be described later.

The carriage 20 moves the head 22 relative to the medium P. The drive mechanism 17 causes the carriage 20 to reciprocate based on a control signal from the main control device 3. The drive mechanism 17 includes, for example, a timing belt 18 and a drive motor 19. By transmitting power of the drive motor 19 to the carriage 20 via the timing belt 18, the carriage 20 reciprocates in the X direction as a main scanning direction. Moreover, the printing apparatus 10 includes a transport mechanism (not illustrated) for moving the medium P in the +Y direction as a sub-scanning direction. When printing is performed, the medium P is moved in the sub-scanning direction by the transport mechanism, and the medium P after the printing is completed is output onto a front cover 11.

Figure 2:
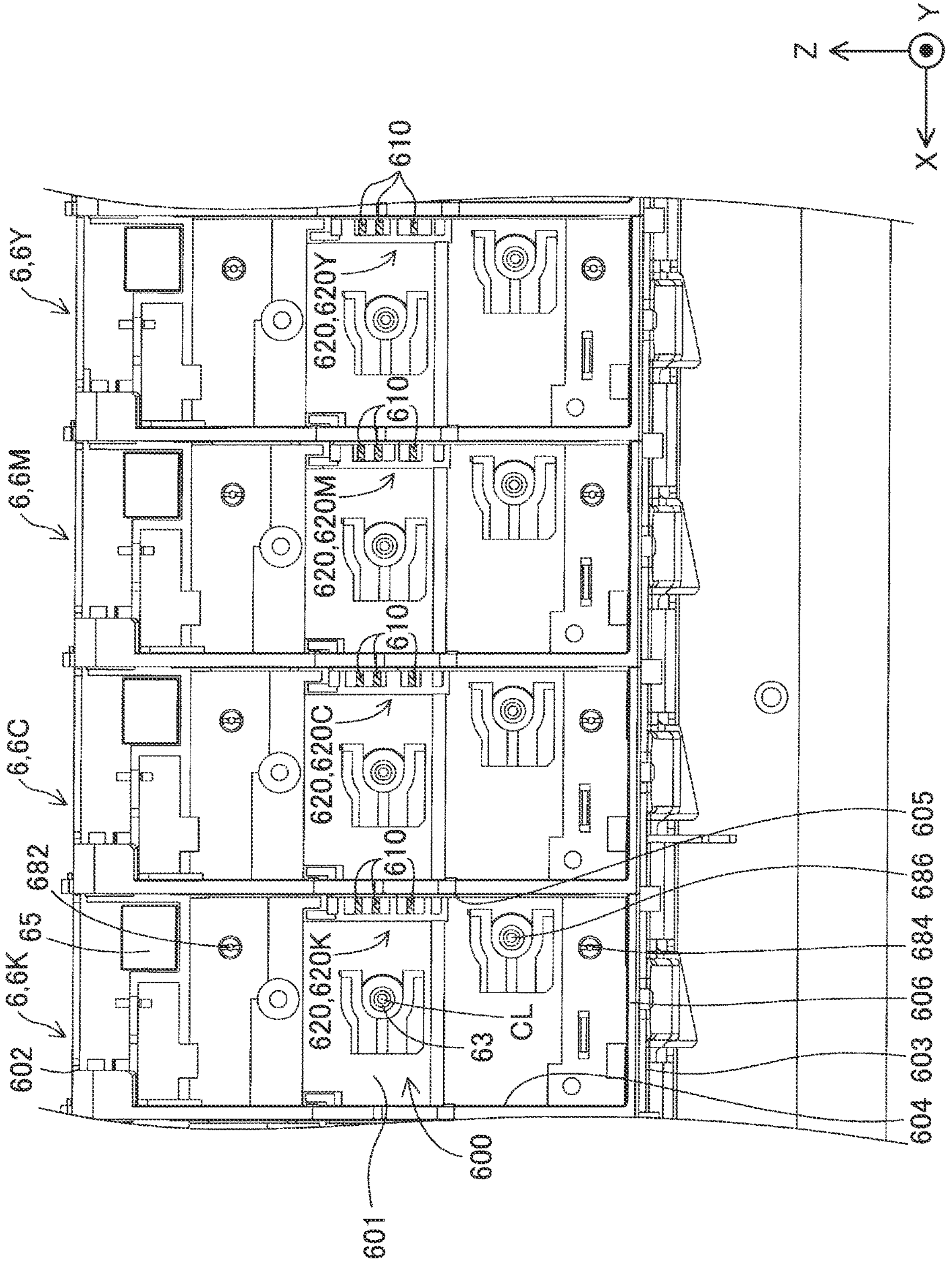
FIG. 2 is a front view of a cartridge mounting portion.
Figure 3:
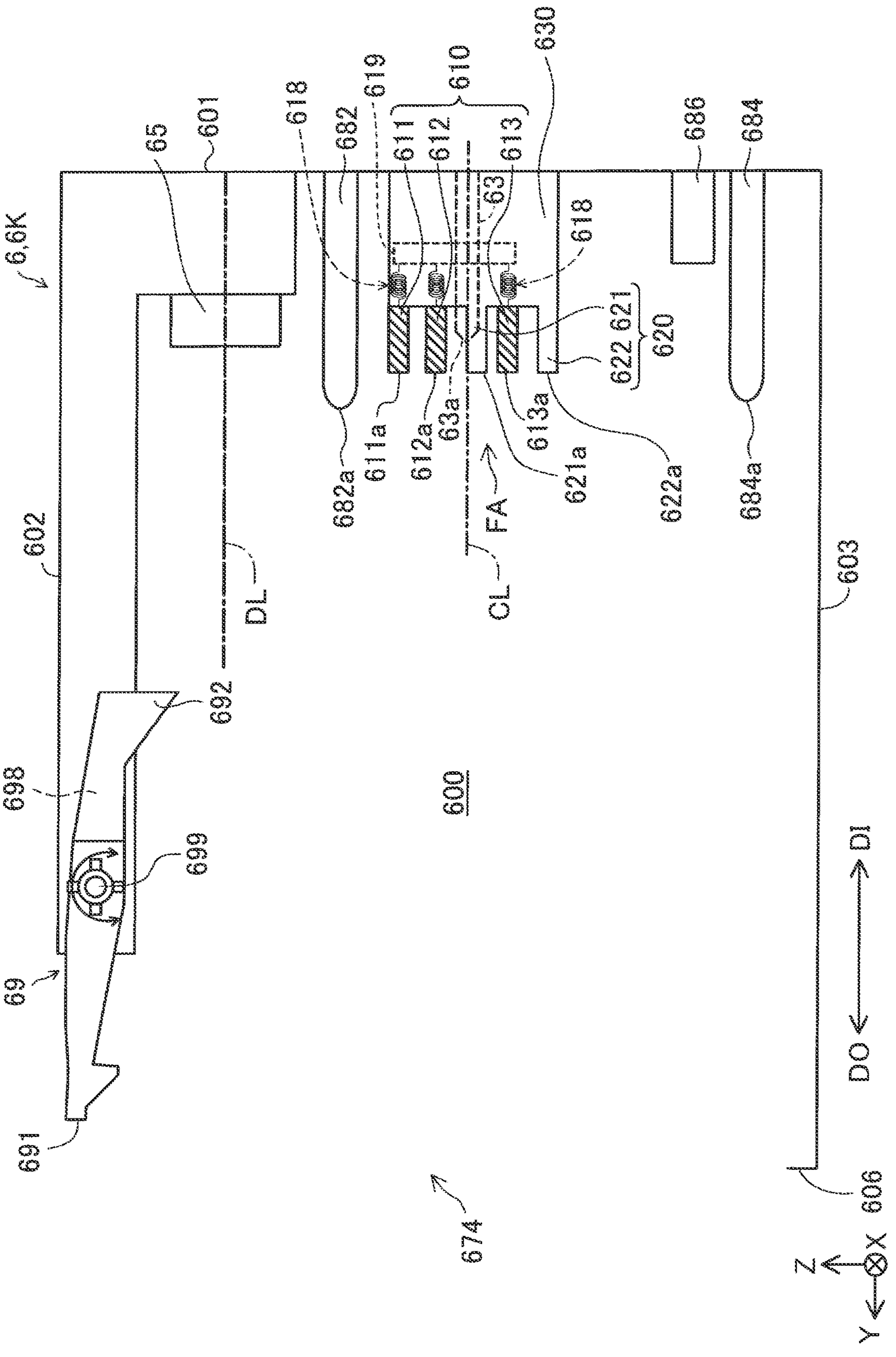
FIG. 3 is a schematic view of a cartridge mounting portion as viewed from an apparatus second side wall side on a −X direction side.

A-2. Detailed Configuration of Cartridge Mounting Portion 6:

FIG. 2 is a front view of the cartridge mounting portion 6. FIG. 3 is a schematic view of the cartridge mounting portion 6 as viewed from an apparatus second side wall 605 side on a −X direction side. The cartridge mounting portion 6 is provided for each type of printing material cartridge 4. In the present embodiment, the printing apparatus 10 includes four cartridge mounting portions 6K, 6C, 6M, and 6Y to which the four printing material cartridges 4K, 4C, 4M, and 4Y are respectively mounted.

As illustrated in FIG. 1, each cartridge mounting portion 6 has the accommodation chamber 600 that accommodates the printing material cartridge 4. In the present embodiment, the accommodation chamber 600 has a substantially rectangular parallelepiped shape as illustrated in FIGS. 2 and 3. With regard to the cartridge mounting portion 6, the X direction is a width direction, the Y direction is a depth direction, and the Z direction is a height direction. The cartridge mounting portion 6 includes, as six walls 601 to 606 forming the accommodation chamber 600, an apparatus rear wall 601, an apparatus upper wall 602, an apparatus bottom wall 603, an apparatus first side wall 604, an apparatus second side wall 605, and the apparatus front wall 606. In the present disclosure, the term "wall" is a concept including a wall constituted by a plurality of walls in addition to a single wall.

As illustrated in FIGS. 1 and 3, the apparatus front wall 606 forms the insertion/removal opening 674 through which the printing material cartridge 4 passes when the printing material cartridge 4 is inserted into or removed from the accommodation chamber 600. As illustrated in FIG. 3, the apparatus rear wall 601 faces the apparatus front wall 606 in the Y direction, and forms a wall of the accommodation chamber 600 on the −Y direction side. The apparatus front wall 606 and the apparatus rear wall 601 are respectively walls that are substantially perpendicular to the horizontal planes along the X and Y directions in the use state of the printing system 1. The apparatus upper wall 602 forms a wall of the accommodation chamber 600 on a +Z direction side. The apparatus bottom wall 603 faces the apparatus upper wall 602 in the Z direction, and forms a wall of the accommodation chamber 600 on a −Z direction side. The apparatus upper wall 602 and the apparatus bottom wall 603 each intersect the apparatus rear wall 601 and the apparatus front wall 606. The apparatus upper wall 602 and the apparatus bottom wall 603 are respectively walls that are substantially parallel to the horizontal plane along the X and Y directions in the use state of the printing system 1. In addition, as illustrated in FIG. 2, the apparatus first side wall 604 forms a wall of the accommodation chamber 600 on a +X direction side. The apparatus second side wall 605 faces the apparatus first side wall 604 in the X direction, and forms a wall of the accommodation chamber 600 on the −X direction side. The apparatus first side wall 604 and the apparatus second side wall 605 each intersect the apparatus rear wall 601, the apparatus front wall 606, the apparatus upper wall 602, and the apparatus bottom wall 603. The apparatus first side wall 604 and the apparatus second side wall 605 are respectively walls that are substantially perpendicular to the horizontal plane along the X and Y directions in the use state of the printing system 1. In the present disclosure, "cross" or "intersect" means any of the following states i. to iii.

i. A state in which two components intersect each other and actually cross each other.

ii. A state in which one component crosses the other component when the one component is extended.

iii. A state in which mutual components cross each other when the mutual components are extended.

As illustrated in FIG. 3, the cartridge mounting portion 6 further includes a restriction mechanism 69, an apparatus-side first positioning portion 682, an apparatus-side second positioning portion 684, a printing material introduction portion 63, a pressurizing portion 686, an apparatus-side engagement portion 620, a movable unit 610, and an apparatus reading portion 65.

The restriction mechanism 69 is engaged with the printing material cartridge 4 illustrated in FIG. 1 to restrict movement of the printing material cartridge 4 toward the +Y direction side, which is the removal direction DO, in the mounting completed state of the printing material cartridge 4. As illustrated in FIG. 3, the restriction mechanism 69 is disposed in the apparatus upper wall 602. The restriction mechanism 69 is a lever and has an operation portion 691, an apparatus-side restriction portion 692, a spring member 698, and a rotating shaft portion 699. The operation portion 691 is exposed to an outside of the cartridge mounting portion 6 so as to be operable by the user. The operation portion 691 is positioned at one end portion of the restriction mechanism 69. The apparatus-side restriction portion 692 is positioned at the other end portion of the restriction mechanism 69. The apparatus-side restriction portion 692 is a protrusion protruding from an apparatus upper wall 602 side to an accommodation chamber 600 side. The spring member 698 urges the apparatus-side restriction portion 692 so that the apparatus-side restriction portion 692 is disposed on the accommodation chamber 600 side, which is an inside of the cartridge mounting portion 6.

The apparatus-side first positioning portion 682 and the apparatus-side second positioning portion 684 are respectively columnar members extending from the apparatus rear wall 601 in the +Y direction, which is the removal direction DO. The apparatus-side first positioning portion 682 is a positioning member that is paired with a cartridge-side first positioning portion 482 of the printing material cartridge 4, which will be described later. In the present embodiment, the apparatus-side first positioning portion 682 is positioned on the apparatus upper wall 602 side from a center portion of the cartridge mounting portion 6 in the Z direction, which is the height direction. The apparatus-side second positioning portion 684 is a positioning member paired with a cartridge-side second positioning portion 484 of the printing material cartridge 4, which will be described later. In the present embodiment, the apparatus-side second positioning portion 684 is positioned on an apparatus bottom wall 603 side from the pressurizing portion 686 in the Z direction. The number and positions of the apparatus-side positioning portions 682 and 684 formed in the cartridge mounting portion 6 are not limited thereto.

The printing material introduction portion 63 is coupled to a printing material supply portion by being inserted into the printing material supply portion of the printing material cartridge 4, which will be described later. The ink as the printing material supplied from the printing material supply portion is introduced into the printing material introduction portion 63. Specifically, the ink is introduced into the printing material introduction portion 63 through an opening formed in a tip end portion 63*a*, which is an end portion of the printing material introduction portion 63 on the +Y direction side. The ink introduced into the printing material introduction portion 63 flows from the printing material introduction portion 63 to the head 22 through the tube 24 illustrated in FIG. 1. In the present embodiment, as illustrated in FIG. 3, the printing material introduction portion 63 is a flow path tube in which a flow path through which the ink flows is formed, and is a tubular member extending from the apparatus rear wall 601 in the +Y direction, which is the removal direction DO. In the present embodiment, a center axis CL of the printing material introduction portion 63 is parallel to the Y-axis. In the present embodiment, as illustrated in FIG. 2, the printing material introduction portion 63 is formed at the center portion of the cartridge mounting portion 6 in the X direction, which is the width direction, and the Z direction, which is the height direction, but a formation position of the printing material introduction portion 63 is not limited thereto. In addition, the printing material introduction portion 63 may be, for example, a flow path needle in which a flow path through which the ink flows is formed.

The pressurizing portion 686 illustrated in FIGS. 2 and 3 is a tubular member in which a pressurized fluid for supplying the ink accommodated in the printing material cartridge 4 to the head 22 illustrated in FIG. 1 is circulated. The pressurized fluid is, for example, pressurized air and is generated by a pressurizing mechanism (not illustrated) provided in the printing apparatus 10. The pressurizing portion 686 supplies the pressurized fluid into the printing material cartridge 4 in the mounting completed state of the printing material cartridge 4. In the present embodiment, the pressurizing portion 686 extends from the apparatus rear wall 601 toward the +Y direction side, which is the removal direction DO. In the present embodiment, the pressurizing portion 686 is formed between the printing material introduction portion 63 and the apparatus-side second positioning portion 684 in the Z direction, which is the height direction of the cartridge mounting portion 6, but a formation position of the pressurizing portion 686 is not limited thereto.

The apparatus-side engagement portion 620 illustrated in FIG. 3 is a member that is paired with a cartridge-side engagement portion 420 of the printing material cartridge 4, which will be described later, to prevent erroneous insertion of the printing material cartridge 4. The apparatus-side engagement portion 620 is an engagement member for physically determining whether or not the printing material cartridge 4 inserted into the accommodation chamber 600 of the cartridge mounting portion 6 is the correct printing material cartridge 4 that is compatible with the cartridge mounting portion 6. The apparatus-side engagement portion 620 is used, for example, to determine whether or not the printing material cartridge 4 having the correct ink color is inserted into the accommodation chamber 600 of the cartridge mounting portion 6.

A pattern of the apparatus-side engagement portion 620 differs depending on the type of the printing material cartridge 4 to be mounted. Specifically, as illustrated in FIG. 2, each of apparatus-side engagement portions 620K, 620C, 620M, and 620Y of the cartridge mounting portions 6K, 6C, 6M, and 6Y is formed by at least one or more protruding ribs. In each apparatus-side engagement portion 620, a pattern determined by the number and positions of ribs formed differs depending on the type of the printing material cartridge 4 mounted in the accommodation chamber 600. In the present embodiment, as illustrated in FIG. 3, the apparatus-side engagement portion 620K is constituted by an apparatus-side first engagement portion 621 and an apparatus-side second engagement portion 622, which are two ribs protruding from a base portion 630 toward the +Y direction side from an apparatus rear wall 601 side toward an apparatus front wall 606 side. The number and positions of the apparatus-side engagement portions 620 formed are not limited thereto. The apparatus-side engagement portion 620 may be formed at a position at which the apparatus-side engagement portion 620 can be engaged with the cartridge-side engagement portion 420 of the printing material cartridge 4 in an insertion process of inserting the printing material cartridge 4 into the cartridge mounting portion 6.

The movable unit 610 illustrated in FIG. 3 is a member for acquiring an insertion amount in the insertion direction DI of the printing material cartridge 4 inserted into the accommodation chamber 600 of the cartridge mounting portion 6. In the present embodiment, the movable unit 610 includes three movable portions 611 to 613 and a measurement mechanism 619. The movable portions 611 to 613 are pushed toward the −Y direction side, which is the insertion direction DI, when the printing material cartridge 4 is pressed by a protruding portion 410, which will be described later, in the insertion process of inserting the printing material cartridge 4 into the cartridge mounting portion 6. An urging member 618 that urges the movable portions 611 to 613 so as to protrude in the +Y direction, which is the removal direction DO, is attached to the movable portions 611 to 613. In the present embodiment, the apparatus-side engagement portion 620 and the movable portions 611 to 613 are integrally formed via the base portion 630. In other words, the movable portions 611 to 613 are positioned in a formation region FA of the apparatus-side engagement portion 620. The movable portions 611 to 613 may be formed at positions at which the movable portions 611 to 613 can be pressed by the protruding portion 410 of the printing material cartridge 4 in the insertion process of inserting the printing material cartridge 4 into the cartridge mounting portion 6, and may be formed in a region different from the formation region FA of the apparatus-side engagement portion 620.

The three movable portions 611 to 613 include a first movable portion 611, a second movable portion 612, and a third movable portion 613. The first movable portion 611 and the second movable portion 612 are formed between the apparatus-side first positioning portion 682 and the printing material introduction portion 63 in the Z direction, which is the height direction of the cartridge mounting portion 6. At this time, the first movable portion 611 is positioned on an apparatus-side first positioning portion 682 side from the second movable portion 612 in the Z direction. The second movable portion 612 is positioned on a printing material introduction portion 63 side in the Z direction. The third movable portion 613 is positioned between the apparatus-side first engagement portion 621 and the apparatus-side second engagement portion 622 in the Z direction. The number and positions of the movable portions 611 to 613 formed in the movable unit 610 are not limited thereto.

The measurement mechanism 619 measures a pushing amount L of the movable portions 611 to 613 pushed by the pressing of the protruding portion 410, which will be described later, that is, a movement amount L of the movable portions 611 to 613 in the insertion direction DI. The measurement mechanism 619 is, for example, a stroke sensor that can measure the movement amount L of the movable portions 611 to 613 in the insertion direction DI.

The apparatus reading portion 65 optically reads the identification portion of the printing material cartridge 4 to acquire the identification information recorded in the identification portion. In the present embodiment, the apparatus reading portion 65 is a QR code reader. The apparatus reading portion 65 includes, for example, an imaging portion (not illustrated) such as a CMOS sensor that takes an image of the identification portion, and a processing portion (not illustrated) that processes the taken image. The apparatus reading portion 65 may include an irradiation portion (not illustrated) that irradiates the identification portion with irradiation light. The identification information referred to here is information for identifying the printing material cartridge 4, and is information such as the type of the printing material cartridge 4, a model number of the printing material cartridge 4, a production lot number of the printing material cartridge 4, and a product number of a compatible model. The compatible model refers to the printing apparatus 10 provided with the cartridge mounting portion 6 that is compatible with the printing material cartridge 4, that is, the printing apparatus 10 in which the printing material cartridge 4 is usable. The identification information may include a cartridge ID assigned to each printing material cartridge 4 in order to distinguish between the printing material cartridges 4, instead of the production lot number of the printing material cartridge 4. Furthermore, in addition to the identification information, precautions for the user who uses the printing material cartridge 4, information indicating a mounting procedure of the printing material cartridge 4, and the like may be recorded on the identification portion. The apparatus reading portion 65 is formed at a position at which the identification portion can be optically read in the insertion process of inserting the printing material cartridge 4 into the cartridge mounting portion 6. In the present embodiment, the apparatus reading portion 65 is formed between the apparatus-side first positioning portion 682 and the apparatus upper wall 602 in the Z direction. That is, the apparatus reading portion 65 is formed inside the cartridge mounting portion 6.

Furthermore, as illustrated in FIG. 1, the printing apparatus 10 includes an informing portion that presents various types of information to the user. In the present embodiment, the informing portion is an apparatus display portion 15. The apparatus display portion 15 displays various types of information such as the identification information of the printing material cartridge 4 obtained by reading the identification portion with the apparatus reading portion 65. The apparatus display portion 15 is, for example, a liquid crystal display or an organic EL display provided on an outer surface of the printing apparatus 10. Then, the apparatus display portion 15 may display, for example, the ink color, model number, and the like of the mounted printing material cartridge 4 so that each mounting position can be known. In addition, the apparatus display portion 15 may not only have the function of visually displaying information but also function as an input operation portion that receives an instruction from the user, such as a touch panel. In addition, the informing portion may be, for example, a speaker that aurally presents various types of information to the user as a voice message or emits a warning sound or a notification sound.

Figure 4:
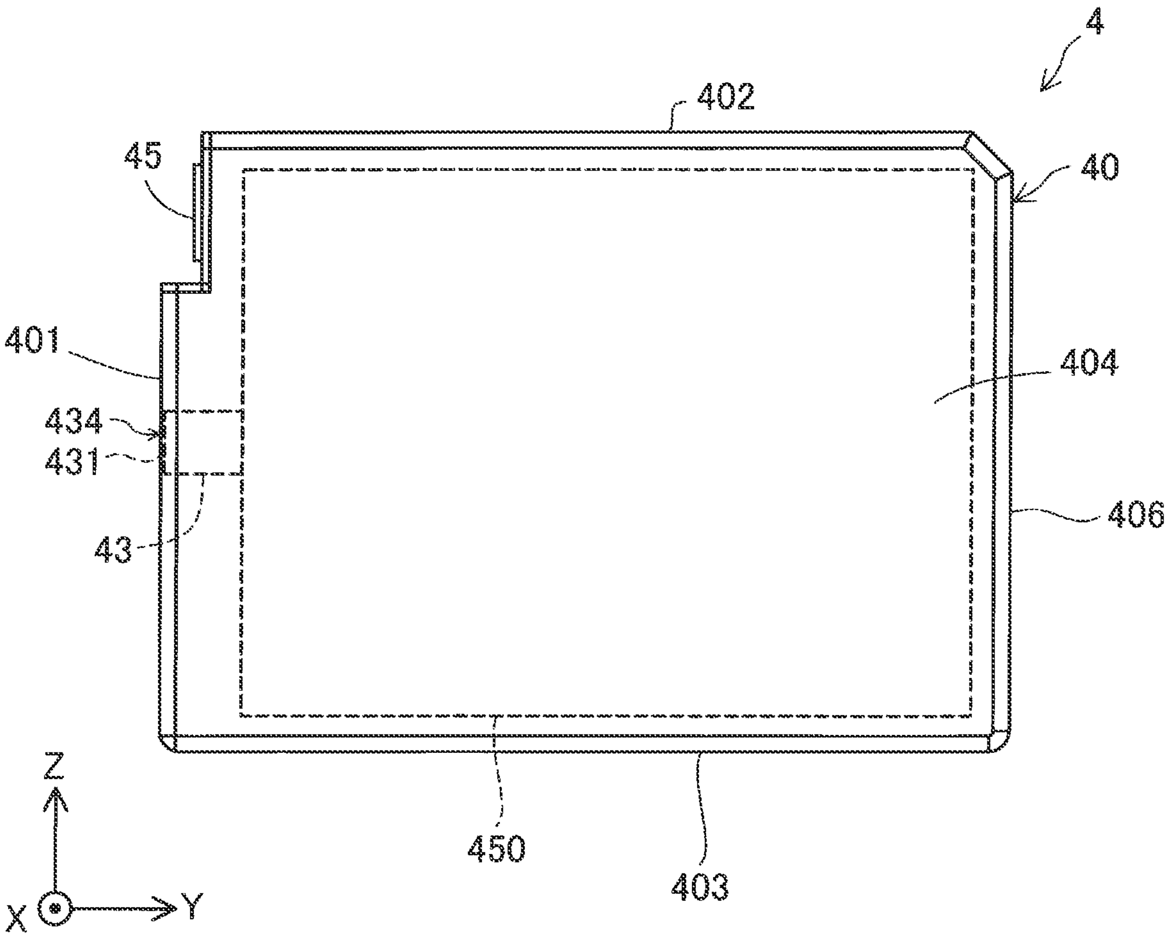
FIG. 4 is a side view of a printing material cartridge according to a first embodiment.
Figure 5:
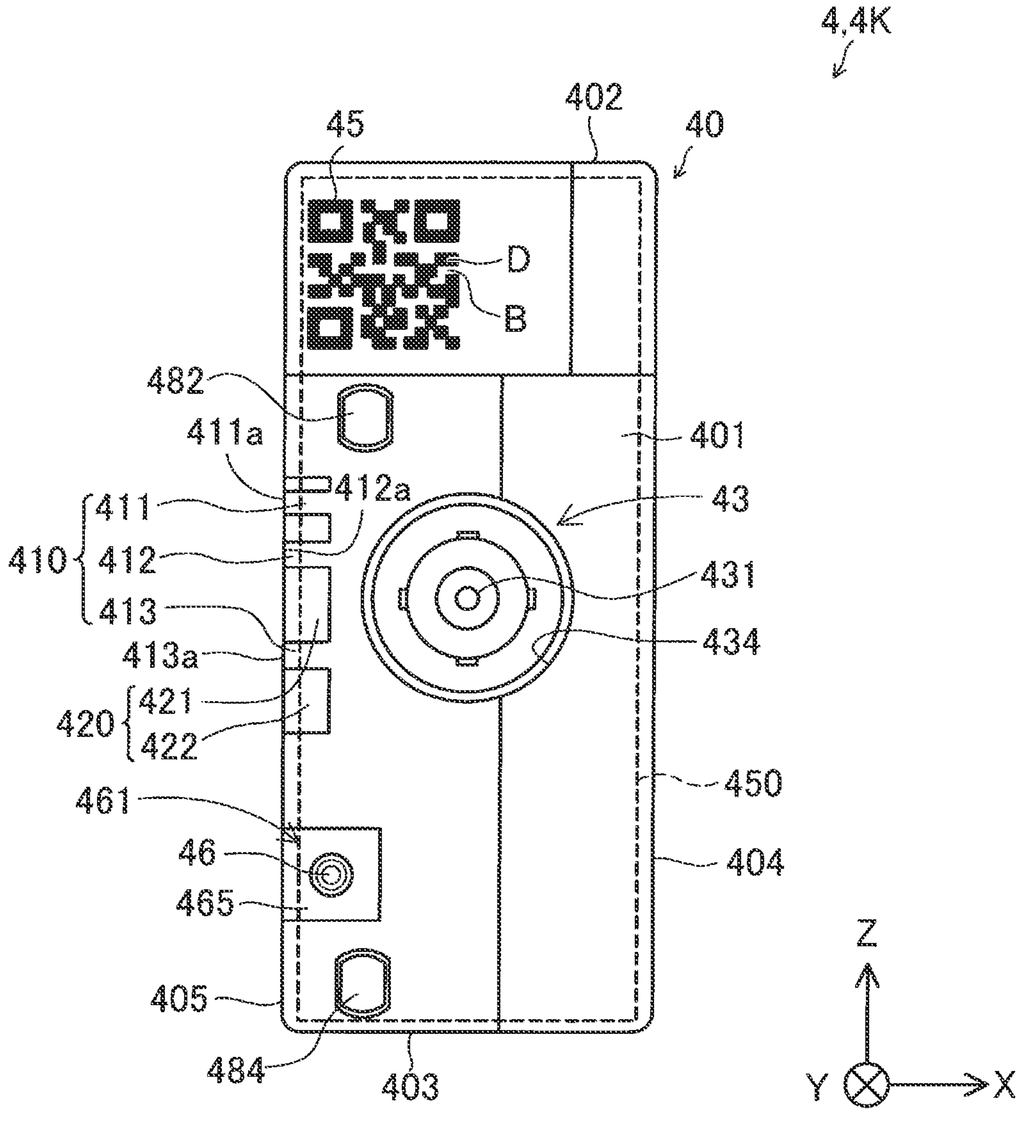
FIG. 5 is a front view of the printing material cartridge.
Figure 6:
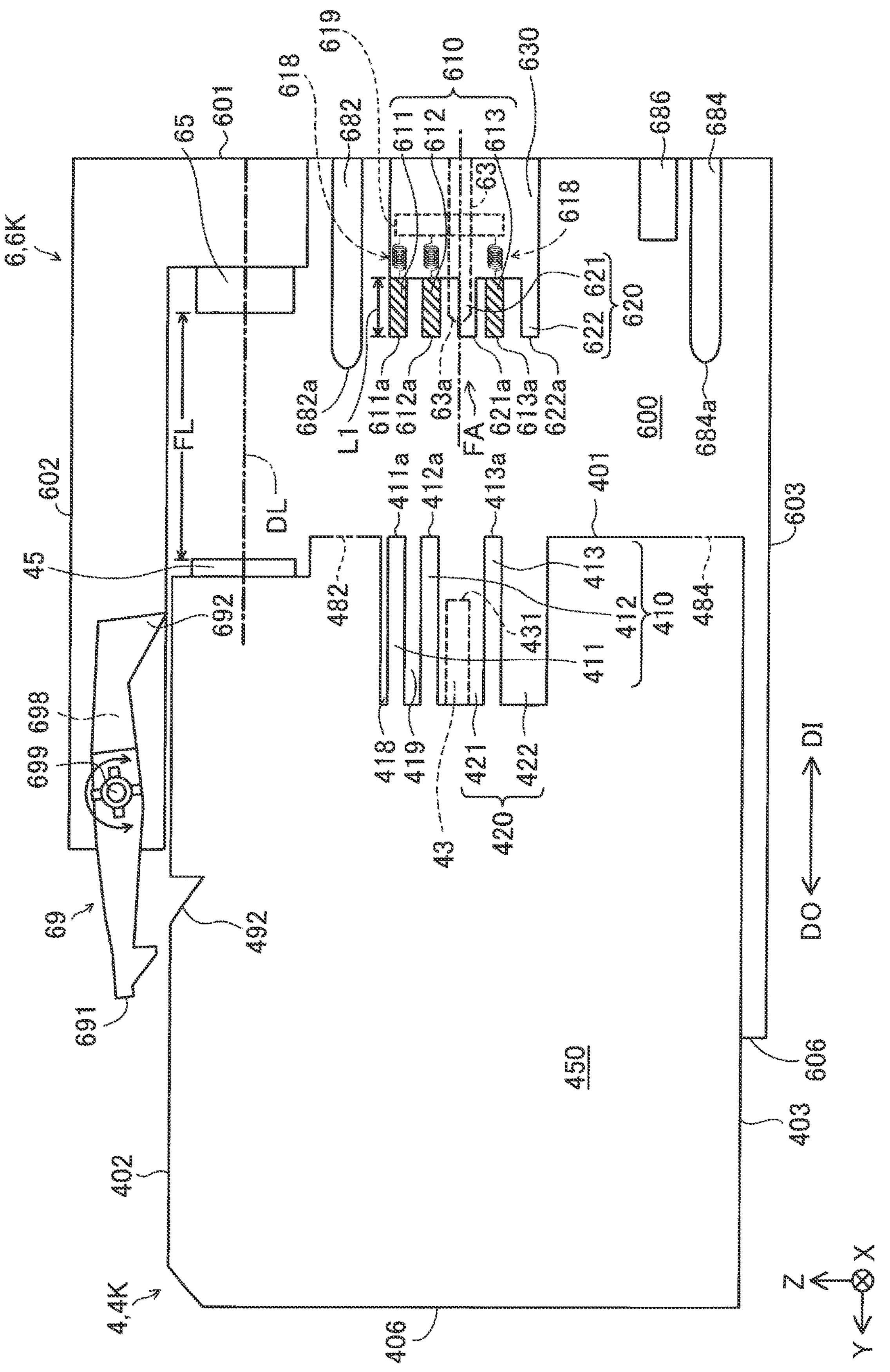
FIG. 6 is a view illustrating the printing material cartridge and the cartridge mounting portion in an insertion process.
Figure 7:
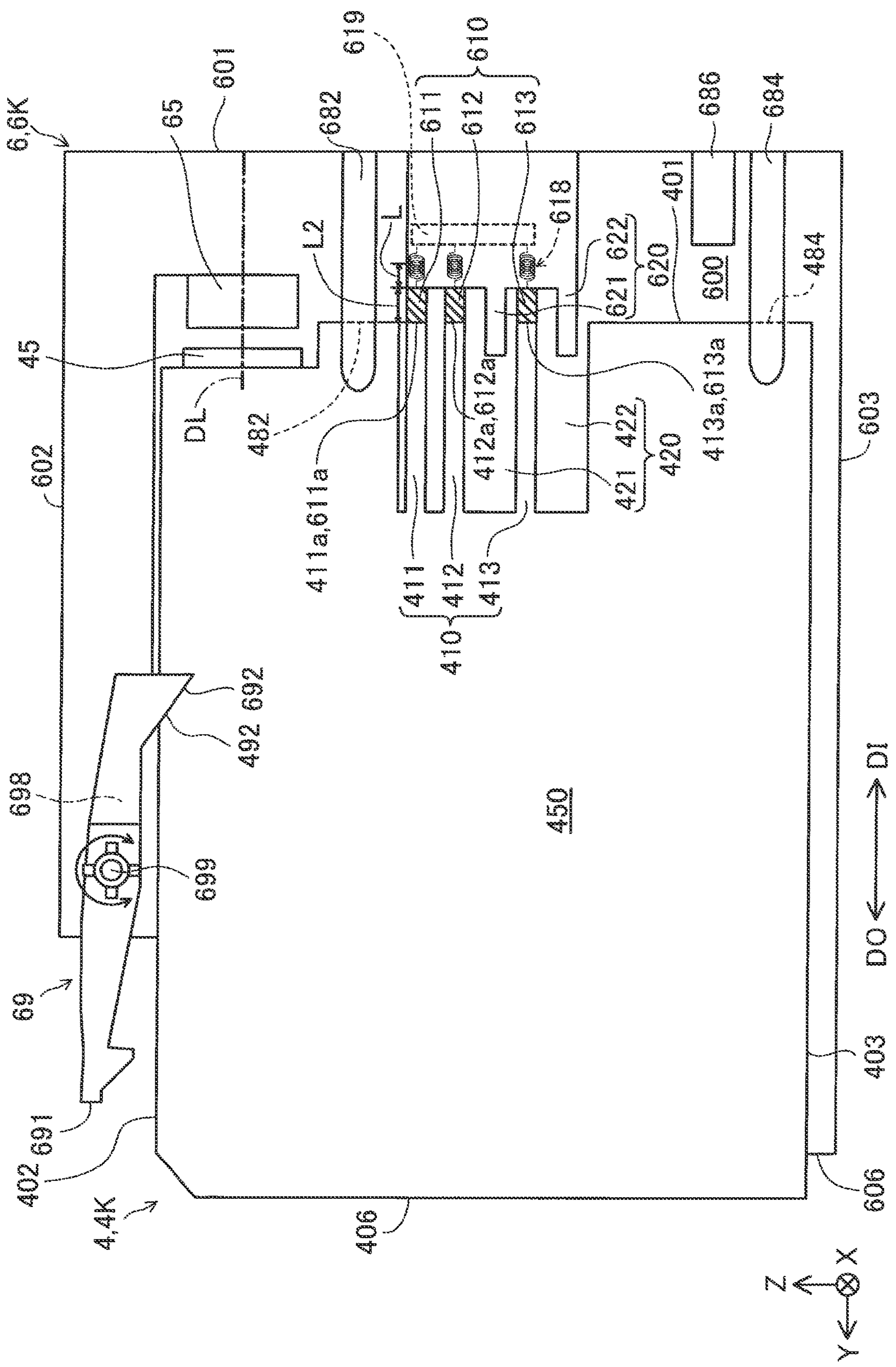
FIG. 7 is a view illustrating the printing material cartridge and the cartridge mounting portion in a mounting completed state.

A-3. Details of Printing Material Cartridge:

FIG. 4 is a side view of the printing material cartridge 4 according to the first embodiment. FIG. 4 illustrates a state in which the printing material cartridge 4 is viewed from a cartridge first side wall 404 side. FIG. 5 is a front view of the printing material cartridge 4. FIG. 5 illustrates a state in which the printing material cartridge 4 is viewed from a cartridge rear wall 401 side. FIG. 6 is a view illustrating the printing material cartridge 4 and the cartridge mounting portion 6 at a time before the printing material cartridge 4 enters the mounting completed state in the insertion process of inserting the printing material cartridge 4 into the cartridge mounting portion 6. FIG. 6 schematically illustrates a state when the printing material cartridge 4 is inserted into a center portion of the accommodation chamber 600 in the Y direction along the insertion direction DI. FIG. 7 is a view illustrating the printing material cartridge 4 and the cartridge mounting portion 6 in the mounting completed state. Each figure from FIG. 4 to FIG. 7 is provided with the XYZ axes in the mounting completed state of the printing material cartridge 4. In addition, in FIGS. 6 and 7, for easy understanding, the movable portions 611 to 613 are hatched. In addition, in FIG. 7, the illustration of the printing material introduction portion 63 and a printing material supply portion 43 is omitted.

As illustrated in FIG. 5, the printing material cartridge 4 includes a case 40 as a housing forming an outer covering, a printing material accommodation portion 450 disposed inside the case 40, a printing material supply portion 43 that discharges the printing material accommodated in the printing material accommodation portion 450 to the outside, and a fluid receiving portion 46 that receives the pressurized fluid. As illustrated in FIG. 4, an outer shape of the printing material cartridge 4, that is, a shape of the case 40 is a substantially rectangular parallelepiped shape. With regard to the printing material cartridge 4, the X direction is a width direction, the Y direction is a depth direction, and the Z direction is a height direction. In the present embodiment, with regard to the outer shape of the printing material cartridge 4, a dimension in the Y direction is the largest, and a dimension in the Z direction and a dimension in the X direction are smaller in this order.

The case 40 is formed of, for example, a synthetic resin. As illustrated in FIGS. 4 and 5, the case 40 includes a cartridge front wall 406, a cartridge rear wall 401, a cartridge upper wall 402, a cartridge bottom wall 403, a cartridge first side wall 404, and a cartridge second side wall 405. As illustrated in FIG. 4, the cartridge front wall 406 forms a wall of the case 40 on the +Y direction side. The cartridge rear wall 401 faces the cartridge front wall 406 in the Y direction, and forms a wall of the case 40 on the −Y direction side. The cartridge rear wall 401 is a wall positioned on an insertion direction DI side in the printing material cartridge 4 from the cartridge mounting portion 6. As illustrated in FIG. 7, the cartridge front wall 406 and the cartridge rear wall 401 are walls substantially perpendicular to the horizontal plane along the X and Y directions in the mounting completed state of the printing material cartridge 4.

As illustrated in FIG. 5, the cartridge rear wall 401 has a disposition hole 434 in which the printing material supply portion 43 is disposed, and a disposition recessed portion 461 in which the fluid receiving portion 46 is disposed. The disposition hole 434 is a hole that penetrates the cartridge rear wall 401 in a thickness direction of the cartridge rear wall 401 along the Y direction. In the present embodiment, the disposition hole 434 is disposed in the cartridge rear wall 401 including a center in the X direction, which is the width direction of the printing material cartridge 4, and in the Z direction, which is the height direction of the printing material cartridge 4. The disposition recessed portion 461 is disposed on the −Z direction side and the −X direction side in the cartridge rear wall 401 from the disposition hole 434. The disposition recessed portion 461 is open at least on the −Y direction side.

The cartridge upper wall 402 forms a wall of the case 40 on the +Z direction side. The cartridge bottom wall 403 faces the cartridge upper wall 402 in the Z direction, and forms a wall of the case 40 on the −Z direction side. The cartridge upper wall 402 and the cartridge bottom wall 403 intersect the cartridge rear wall 401 and the cartridge front wall 406, respectively. The cartridge upper wall 402 and the cartridge bottom wall 403 are walls that are substantially parallel to the horizontal plane along the X and Y directions in the mounting completed state of the printing material cartridge 4.

As illustrated in FIG. 5, the cartridge first side wall 404 forms a wall of the case 40 on the +X direction side. The cartridge second side wall 405 faces the cartridge first side wall 404 in the X direction, and forms a wall of the case 40 on the −X direction side. The cartridge first side wall 404 and the cartridge second side wall 405 each intersect the cartridge rear wall 401, the cartridge upper wall 402, the cartridge bottom wall 403, and the cartridge front wall 406. The cartridge first side wall 404 and the cartridge second side wall 405 are walls that are substantially perpendicular to the horizontal plane along the X and Y directions in the mounting completed state of the printing material cartridge 4.

The printing material accommodation portion 450 illustrated in FIG. 5 is a container that accommodates the printing material. In the present embodiment, the printing material accommodation portion 450 is an ink pack formed of a bag-shaped film having flexibility. The printing material accommodation portion 450 decreases in volume with the consumption of the ink. A configuration of the printing material accommodation portion 450 is not limited thereto. The printing material accommodation portion 450 may be configured to accommodate the printing material, and may be formed by, for example, an internal space of the case 40.

The printing material supply portion 43 illustrated in FIG. 5 is a member for supplying the ink as the printing material accommodated in the printing material accommodation portion 450 to the printing material introduction portion 63 of the cartridge mounting portion 6. To one end of the printing material supply portion 43, a supply port 431 that supplies the printing material to the printing apparatus 10 by causing the ink accommodated in the printing material accommodation portion 450 to flow out to the outside is attached. The printing material supply portion 43 communicates with the printing material accommodation portion 450 via the supply port 431. In the present embodiment, the supply port 431 is disposed in the disposition hole 434.

The fluid receiving portion 46 illustrated in FIG. 5 makes the outside and the inside of the case 40 communicate with each other. The fluid receiving portion 46 receives the pressurized fluid supplied from the pressurizing portion 686. The fluid receiving portion 46 is a tubular member that extends in the −Y direction from a recessed portion bottom surface 465 on the +Y direction side in the disposition recessed portion 461. As illustrated in FIG. 7, the fluid receiving portion 46 is coupled to the pressurizing portion 686 by being inserted into the pressurizing portion 686 of the cartridge mounting portion 6 in the mounting completed state of the printing material cartridge 4. Accordingly, the fluid receiving portion 46 receives the pressurized fluid supplied from the pressurizing portion 686. The pressurized fluid supplied to the fluid receiving portion 46 is introduced into the case 40 and pressurizes the inside of the case 40 to pressurize the printing material accommodation portion 450 from the outside. Accordingly, the ink stored in the printing material accommodation portion 450 is supplied to the printing material introduction portion 63 via the supply port 431. In addition, depending on the configuration of the printing material accommodation portion 450, the printing material cartridge 4 may be provided with an atmospheric communication hole or the like that makes the inside and the outside of the case 40 communicate with each other, instead of the fluid receiving portion 46.

As illustrated in FIGS. 5 and 6, the printing material cartridge 4 further includes a cartridge-side restriction portion 492, the cartridge-side first positioning portion 482, the cartridge-side second positioning portion 484, the cartridge-side engagement portion 420, the protruding portion 410, and the identification portion 45.

As illustrated in FIG. 7, the cartridge-side restriction portion 492 is a recessed portion that receives the protruding apparatus-side restriction portion 692, which protrudes toward the accommodation chamber 600. In the mounting completed state of the printing material cartridge 4, the apparatus-side restriction portion 692 and the cartridge-side restriction portion 492 are engaged with each other. On the other hand, in the insertion process of inserting the printing material cartridge 4 into the cartridge mounting portion 6, as illustrated in FIG. 6, the apparatus-side restriction portion 692 and the cartridge-side restriction portion 492 do not engage with each other and maintains a positional relationship in which the apparatus-side restriction portion 692 and the cartridge-side restriction portion 492 do not interfere with each other.

As illustrated in FIG. 7, the cartridge-side first positioning portion 482 is a hole that can receive the apparatus-side first positioning portion 682. That is, the cartridge-side first positioning portion 482 is formed at a position corresponding to the apparatus-side first positioning portion 682. The cartridge-side second positioning portion 484 is a hole that can receive the apparatus-side second positioning portion 684. That is, the cartridge-side second positioning portion 484 is formed at a position corresponding to the apparatus-side second positioning portion 684.

In the present embodiment, as illustrated in FIGS. 6 and 7, the apparatus-side positioning portions 682 and 684 are protruding members, and the cartridge-side positioning portions 482 and 484 are recessed members that receive the apparatus-side positioning portions 682 and 684, but the apparatus-side positioning portions 682 and 684 and the cartridge-side positioning portions 482 and 484 are not limited thereto. For example, the cartridge-side positioning portions 482 and 484 may be protruding members, and the apparatus-side positioning portions 682 and 684 may be recessed members that receive the cartridge-side positioning portions 482 and 484 in the insertion process of inserting the printing material cartridge 4 into the cartridge mounting portion 6.

Figures 16, 17:
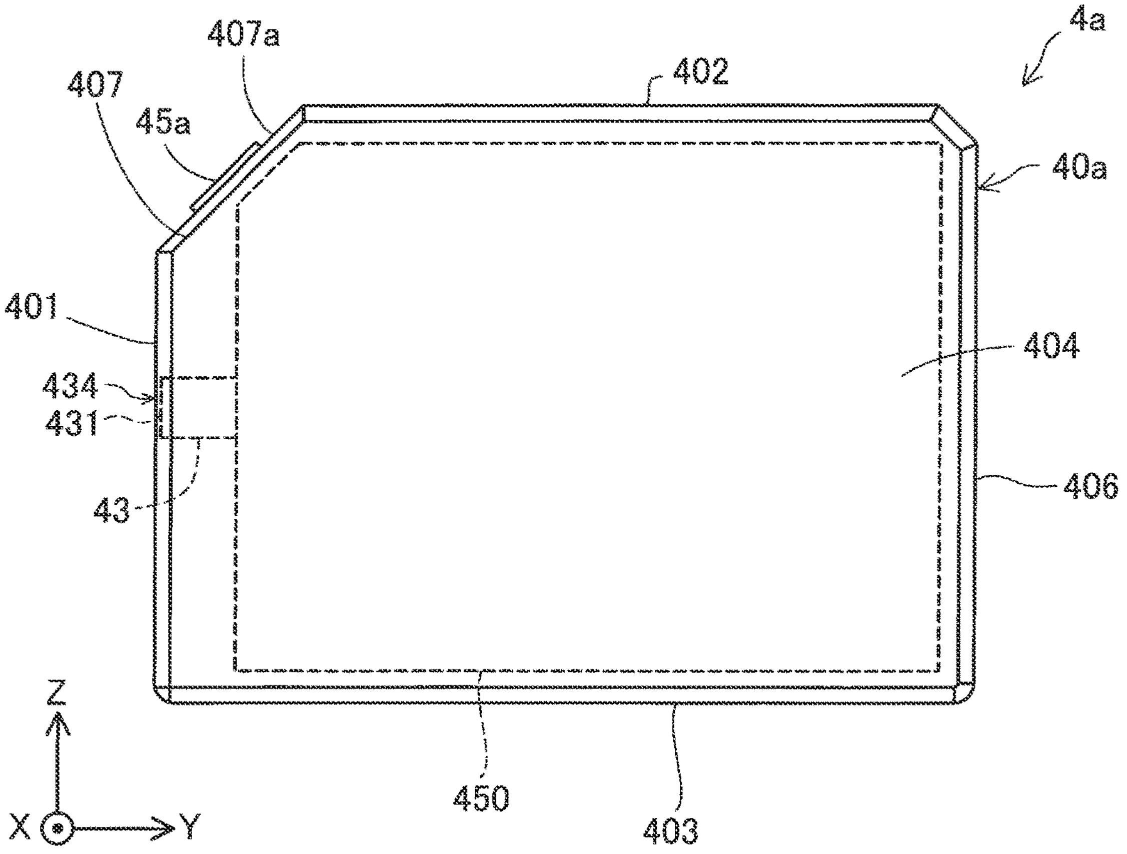
FIG. 16 is a diagram illustrating an example of a management table.
FIG. 17 is a side view of a printing material cartridge in a third embodiment.

As illustrated in FIG. 7, the cartridge-side engagement portion 420 engages with the apparatus-side engagement portion 620 in the insertion process of inserting the printing material cartridge 4 into the cartridge mounting portion 6. In the present embodiment, the cartridge-side engagement portion 420 is a recessed portion that is recessed from the cartridge rear wall 401 in the +Y direction, which is the same as a protruding direction of the apparatus-side first positioning portion 682, to receive the apparatus-side engagement portion 620. Hereinafter, a surface at which the cartridge-side engagement portion 420 is formed is also referred to as a formation surface. In the present embodiment, the formation surface is an outer surface of the cartridge rear wall 401. That is, as illustrated in FIG. 6, the formation surface is a surface that faces the apparatus reading portion 65 in an optical axis direction DL when the apparatus reading portion 65 reads the identification portion 45 in the insertion process of inserting the printing material cartridge 4 into the cartridge mounting portion 6, and is orthogonal to the optical axis direction DL. The formation surface may be a planar surface, may have an inclined surface 407*a* as illustrated in FIG. 17, which will be described later, or may be a surface having unevenness as illustrated in FIG. 4. In the present embodiment, the cartridge-side engagement portion 420 and the supply port 431 are both formed at the same formation surface.

As illustrated in FIG. 2, a shape of the cartridge-side engagement portion 420 differs depending on the type of the printing material cartridge 4. In the present embodiment, the cartridge-side engagement portion 420 is constituted by a cartridge-side first engagement portion 421 and a cartridge-side second engagement portion 422. The cartridge-side first engagement portion 421 is a recessed portion that is recessed from the cartridge rear wall 401 in the +Y direction, which is the same as a protruding direction of the apparatus-side first engagement portion 621, to receive the apparatus-side first engagement portion 621. The cartridge-side second engagement portion 422 is a recessed portion that is recessed from the cartridge rear wall 401 in the +Y direction, which is the same as a protruding direction of the apparatus-side second engagement portion 622, to receive the apparatus-side second engagement portion 622.

The cartridge-side engagement portion 420 may be formed at a position at which the cartridge-side engagement portion 420 can be engaged with the apparatus-side engagement portion 620 in the insertion process of inserting the printing material cartridge 4 into the cartridge mounting portion 6, and the number and positions of the cartridge-side engagement portions 420 formed are not limited thereto. In addition, in the present embodiment, as illustrated in FIGS. 6 and 7, the apparatus-side engagement portion 620 is a protruding member, and the cartridge-side engagement portion 420 is a recessed member that receives the apparatus-side engagement portion 620, but the apparatus-side engagement portion 620 and the cartridge-side engagement portion 420 are not limited thereto. For example, the cartridge-side engagement portion 420 may be a protruding member, and the apparatus-side engagement portion 620 may be a recessed member that receives the cartridge-side engagement portion 420. That is, the cartridge-side first engagement portion 421 may be a protruding member, and the apparatus-side first engagement portion 621 may be a recessed member that receives the cartridge-side first engagement portion 421. At this time, the apparatus-side second engagement portion 622 may be a protruding member, and the cartridge-side second engagement portion 422 may be a recessed member that receives the apparatus-side second engagement portion 622.

As illustrated in FIGS. 6 and 7, the protruding portion 410 comes into contact with the movable portions 611 to 613 of the cartridge mounting portion 6 in the insertion process of inserting the printing material cartridge 4 into the cartridge mounting portion 6, and presses the movable portions 611 to 613 to push the movable portions 611 to 613 toward the −Y direction side, which is the insertion direction DI. The protruding portion 410 is a rib extending in the −Y direction, which is the insertion direction DI. In the present embodiment, the cartridge-side engagement portion 420 and the protruding portion 410 are integrally formed. In other words, the protruding portion 410 is positioned in the formation region FA of the cartridge-side engagement portion 420. The protruding portion 410 may be formed at a position at which the protruding portion 410 can press the movable portions 611 to 613 in the insertion process of inserting the printing material cartridge 4 into the cartridge mounting portion 6, and may be formed in a region different from the formation region FA of the cartridge-side engagement portion 420.

In the present embodiment, the protruding portion 410 is constituted by a first protruding portion 411, a second protruding portion 412, and a third protruding portion 413. The first protruding portion 411, the second protruding portion 412, and the third protruding portion 413 are provided in this order in the Z direction, which is the height direction of the printing material cartridge 4. Specifically, the first protruding portion 411 is formed between two recessed portions 418 and 419 provided on a cartridge-side first positioning portion 482 side in the Z direction. The two recessed portions 418 and 419 are a first recessed portion 418 and a second recessed portion 419 positioned on the −Z direction side from the first recessed portion 418. Both the first recessed portion 418 and the second recessed portion 419 are recessed from the cartridge rear wall 401 toward the +Y direction side in the removal direction DO. The second protruding portion 412 is formed between the second recessed portion 419 and the cartridge-side first engagement portion 421. The third protruding portion 413 is formed between the cartridge-side first engagement portion 421 and the cartridge-side second engagement portion 422.

The identification portion 45 illustrated in FIG. 5 is a code in which a pattern and a shape are formed according to an arrangement pattern of a plurality of light-colored cells B and a plurality of dark-colored cells D. Identification information J for identifying the printing material cartridge 4 is recorded on the identification portion 45. The identification portion 45 is formed at a position at which the identification portion 45 can be optically read by the apparatus reading portion 65 formed inside the cartridge mounting portion 6 in the insertion process of inserting the printing material cartridge 4 into the cartridge mounting portion 6. The position at which the identification portion 45 can be optically read is, for example, as illustrated in FIG. 6, a position that faces the apparatus reading portion 65 in the optical axis direction DL of a lens, which is a reading direction when the apparatus reading portion 65 reads the identification portion 45, in the insertion process of inserting the printing material cartridge 4 into the cartridge mounting portion 6. In the present embodiment, the optical axis direction DL of the lens is the Y direction. The identification portion 45 is formed at the cartridge upper wall 402 side and on the cartridge second side wall 405 side in the cartridge rear wall 401 of the printing material cartridge 4. That is, the cartridge-side engagement portion 420, the supply port 431, and the identification portion 45 are all formed at the same formation surface.

In addition, in the present embodiment, the identification portion 45 is formed at the cartridge rear wall 401 of the printing material cartridge 4 by laser printing. The identification portion 45 is formed by, for example, a laser marker. For example, the laser marker changes a state of an outer surface of the case 40 formed of a synthetic resin or the like by irradiation with a laser beam such that a color tone difference is generated between an irradiation region irradiated with the laser beam and a non-irradiation region that is not irradiated with the laser beam. That is, the light-colored cells B and the dark-colored cells D of the identification portion 45 are formed by the color tone difference between the irradiation region and the non-irradiation region. The type, formation position, and formation method of the identification portion 45 are not limited thereto.

A-4. Description of Method of Attaching and Detaching Printing Material Cartridge:

When mounting the printing material cartridge 4 in the cartridge mounting portion 6, the user pushes the printing material cartridge 4 in the insertion direction DI from the insertion/removal opening 674 toward an inside of the accommodation chamber 600 in a state in which the cartridge rear wall 401 and the apparatus rear wall 601 face each other. Accordingly, as illustrated in FIG. 6, the printing material cartridge 4 is inserted into the accommodation chamber 600 through the insertion/removal opening 674. At this time, in the present embodiment, the apparatus-side first positioning portion 682 and the apparatus-side second positioning portion 684 each extend toward the +Y direction side beyond the apparatus-side engagement portion 620. That is, the tip end portion 682_a_ of the apparatus-side first positioning portion 682 and the tip end portion 684_a_ of the apparatus-side second positioning portion 684 are respectively positioned on the +Y direction side from the tip end portion 621_a_ of the apparatus-side first engagement portion 621 and the tip end portion 622_a_ of the apparatus-side second engagement portion 622. Therefore, in the insertion process of inserting the printing material cartridge 4 into the cartridge mounting portion 6, the apparatus-side positioning portions 682 and 684 are guided to the cartridge-side positioning portions 482 and 484 before the apparatus-side engagement portion 620 and the cartridge-side engagement portion 420 are engaged with each other. Specifically, the apparatus-side first positioning portion 682 is accommodated in the cartridge-side first positioning portion 482. The apparatus-side second positioning portion 684 is accommodated in the cartridge-side second positioning portion 484. Accordingly, the printing material cartridge 4 is positioned with respect to the cartridge mounting portion 6, and the movement of the printing material cartridge 4 in the X direction and in the Z direction orthogonal to the insertion direction DI is restricted.

In the insertion process of inserting the printing material cartridge 4 into the cartridge mounting portion 6, after the printing material cartridge 4 is positioned with respect to the cartridge mounting portion 6, the engagement between the cartridge-side engagement portion 420 and the apparatus-side engagement portion 620 starts. As illustrated in FIG. 7, in the insertion process of inserting the printing material cartridge 4 into the cartridge mounting portion 6, when the correct printing material cartridge 4 that is compatible with the cartridge mounting portion 6 is inserted into the cartridge mounting portion 6, the apparatus-side engagement portion 620 and the cartridge-side engagement portion 420 are engaged so as to fit into each other without colliding with each other. On the other hand, although not illustrated, when a printing material cartridge 4 that is not compatible with the cartridge mounting portion 6, for example, a printing material cartridge 4 having a different ink color is inserted into the cartridge mounting portion 6, the apparatus-side engagement portion 620 and the cartridge-side engagement portion 420 are not engaged with each other and collide with each other. Then, the collision between the apparatus-side engagement portion 620 and the cartridge-side engagement portion 420 disrupts further insertion of the printing material cartridge 4 into the cartridge mounting portion 6. In this manner, it is determined whether or not the printing material cartridge 4 inserted into the accommodation chamber 600 of the cartridge mounting portion 6 is the correct printing material cartridge 4 that is compatible with the cartridge mounting portion 6.

Furthermore, as illustrated in FIG. 7, in the insertion process of inserting the printing material cartridge 4 into the cartridge mounting portion 6, by pushing the printing material cartridge 4 in the insertion direction DI, tip end portions 411*a* to 413*a* of the protruding portion 410 respectively come into contact with tip end portions 611*a* to 613*a* of the movable portions 611 to 613. Then, the movable portions 611 to 613 are pressed by the protruding portions 410, so that the movable portions 611 to 613 are pushed toward the +Y direction side, which is the insertion direction DI, against an urging force in the +Y direction by the urging member 618. At this time, the measurement mechanism 619 measures the movement amount L of the movable portions 611 to 613 in the insertion direction DI. The movement amount L of the movable portions 611 to 613 in the insertion direction DI measured by the measurement mechanism 619 is output to the main control device 3.

In the present embodiment, in the insertion process of inserting the printing material cartridge 4 into the cartridge mounting portion 6, the first movable portion 611 is pressed against the first protruding portion 411 in a state in which the tip end portion 411*a* of the first protruding portion 411 and the tip end portion 611*a* of the first movable portion 611 are in contact with each other. Accordingly, the first movable portion 611 is pushed by the first protruding portion 411 toward the −Y direction side, which is the insertion direction DI side, in the insertion process of inserting the printing material cartridge 4 into the cartridge mounting portion 6. In addition, in the insertion process of inserting the printing material cartridge 4 into the cartridge mounting portion 6, the second movable portion 612 is pressed against the second protruding portion 412 in a state in which the tip end portion 412*a* of the second protruding portion 412 and the tip end portion 612*a* of the second movable portion 612 are in contact with each other. Accordingly, the second movable portion 612 is pushed toward the insertion direction DI side by the second protruding portion 412 in the insertion process of inserting the printing material cartridge 4 into the cartridge mounting portion 6. Furthermore, in the insertion process of inserting the printing material cartridge 4 into the cartridge mounting portion 6, the third movable portion 613 is pressed against the third protruding portion 413 in a state in which the tip end portion 413*a* of the third protruding portion 413 and the tip end portion 613*a* of the third movable portion 613 are in contact with each other. Accordingly, the third movable portion 613 is pushed toward the insertion direction DI side by the third protruding portion 413 in the insertion process of inserting the printing material cartridge 4 into the cartridge mounting portion 6.

In the present embodiment, as illustrated in FIG. 7, when the movable portions 611 to 613 are pressed against the protruding portion 410 in the insertion process of inserting the printing material cartridge 4 into the cartridge mounting portion 6, at least some of the movable portions 611 to 613 are pushed into the base portion 630 and accommodated, but the movable portions 611 to 613 are not limited thereto. For example, the movable portions 611 to 613 may be formed of a stretchable member or an elastic member that is able to change in a dimension in the Y direction along the insertion direction DI according to a pressing force of the protruding portion 410 when the movable portions 611 to 613 are pressed by the protruding portion 410 in the insertion process of inserting the printing material cartridge 4 into the cartridge mounting portion 6.

Furthermore, in the insertion process of inserting the printing material cartridge 4 into the cartridge mounting portion 6, when a distance between the identification portion 45 and the apparatus reading portion 65 in the Y direction becomes a focal length FL of the apparatus reading portion 65, the identification portion 45 is read by the apparatus reading portion 65. The identification information J obtained by optically reading the identification portion 45 with the apparatus reading portion 65 is output to the main control device 3. The focal length FL may be variable by using a variable focus lens or the like.

By further pushing the printing material cartridge 4 in the insertion direction DI, the cartridge-side restriction portion 492 reaches the position of the apparatus-side restriction portion 692. Accordingly, the apparatus-side restriction portion 692 is rotated toward the −Z direction side, which is a gravity direction side, about the rotating shaft portion 699 by an urging force of the spring member 698. Accordingly, the apparatus-side restriction portion 692 moves toward the accommodation chamber 600 side and is received by the cartridge-side restriction portion 492, and the apparatus-side restriction portion 692 and the cartridge-side restriction portion 492 are engaged with each other. As described above, the printing system 1 is in the mounting completed state in which the mounting of the printing material cartridge 4 in the cartridge mounting portion 6 is completed.

When removing the printing material cartridge 4 mounted in the cartridge mounting portion 6, first, as illustrated in FIG. 6, the user pushes down the operation portion 691 toward the −Z direction to bring the operation portion 691 into a pressed state. Accordingly, the printing material cartridge 4 and the apparatus-side restriction portion 692 do not interfere with each other in a process of removing the printing material cartridge 4 from the cartridge mounting portion 6. Next, the user pulls out the printing material cartridge 4 in the removal direction DO. Accordingly, the printing material cartridge 4 is removed from the accommodation chamber 600 via the insertion/removal opening 674. At least a part of an operation of attaching and detaching the printing material cartridge 4 to and from the cartridge mounting portion 6 may be performed mechanically.

Figure 8:
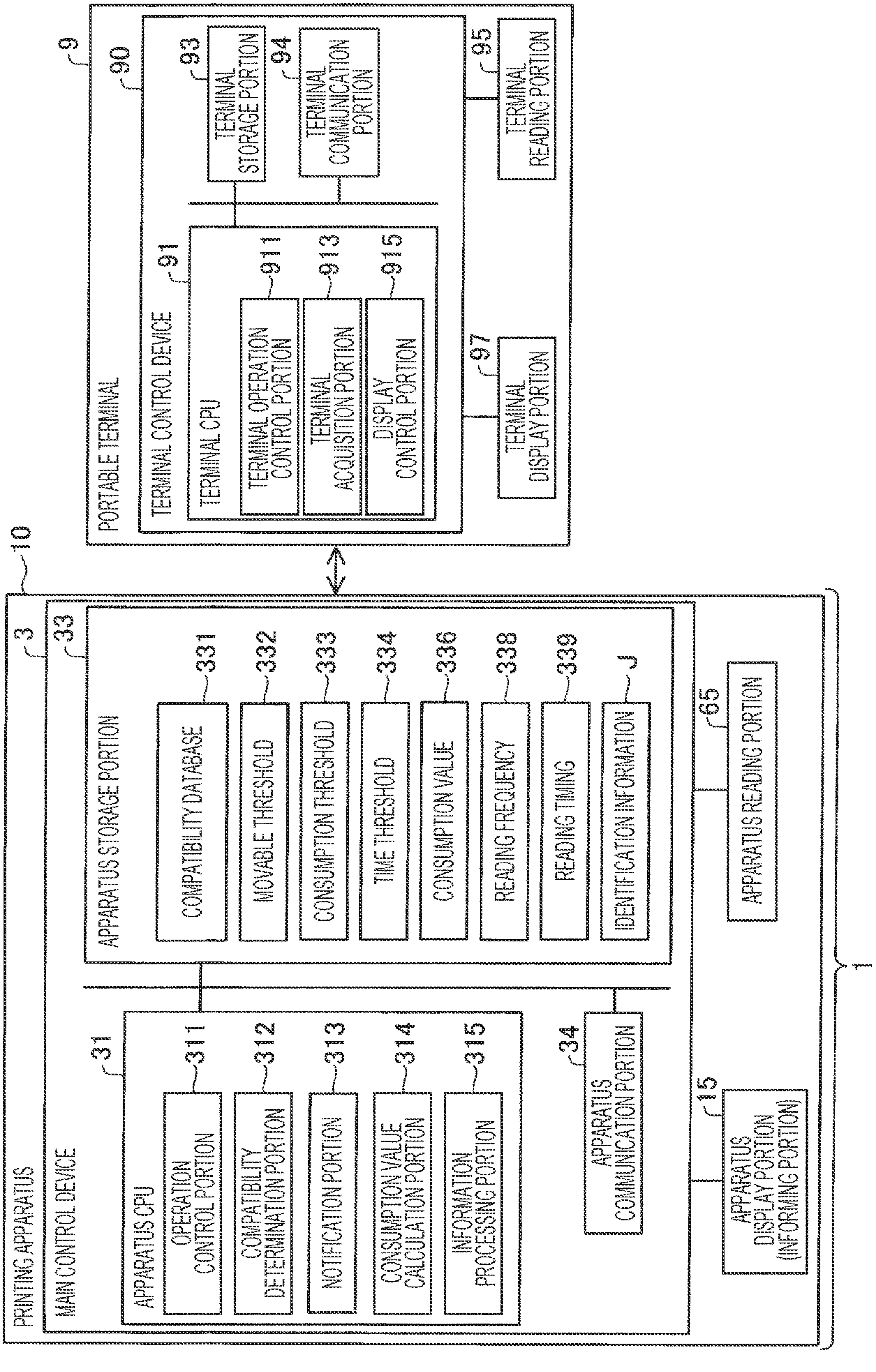
FIG. 8 is a block diagram illustrating a schematic configuration of the printing system and a portable terminal.

A-5. Detailed Configuration of Main Control Device:

FIG. 8 is a block diagram illustrating a schematic configuration of the printing system 1 and the portable terminal 9 that can communicate with the printing system 1. FIG. 8 illustrates a portion of the configuration of the printing system 1 as a representative. The main control device 3 controls an operation of the printing apparatus 10 and performs various processes. The main control device 3 includes an apparatus communication portion 34, an apparatus storage portion 33, and an apparatus CPU 31. The main control device 3 is communicatively connected to the apparatus display portion 15, the apparatus reading portion 65, and an external device such as the portable terminal 9 via the apparatus communication portion 34.

The apparatus storage portion 33 is a storage portion provided in the main control device 3. The apparatus storage portion 33 stores various programs that control the operation of the printing apparatus 10, various thresholds 332 to 334, and the identification information J read by the apparatus reading portion 65. In the present embodiment, the various thresholds 332 to 334 include a movable threshold 332, a consumption threshold 333, and a time threshold 334, and are used for processes based on a function of the apparatus CPU 31. Furthermore, the apparatus storage portion 33 stores various types of data including a compatibility database 331, a consumption value 336, a reading frequency 338, and a reading timing 339. The various types of data 331 and 334 to 339 are stored in association with the identification information J. Details of the various types of data 331 and 334 to 339 stored in the apparatus storage portion 33 will be described later. The apparatus storage portion 33 includes, for example, a RAM, a ROM, and a rewritable non-volatile memory.

The apparatus CPU 31 functions as an operation control portion 311, a compatibility determination portion 312, a notification portion 313, a consumption value calculation portion 314, and an information processing portion 315 by deploying various programs, data, and the like stored in the apparatus storage portion 33. In the present embodiment, the apparatus CPU 31 realizes the above-described functions by deploying various programs, data, and the like stored in the apparatus storage portion 33. The operation control portion 311 controls the operation of the printing apparatus 10. The compatibility determination portion 312 determines whether or not the printing material cartridge 4 is compatible with the cartridge mounting portion 6 by using the identification information J obtained by reading the identification portion 45 with the apparatus reading portion 65. When the movement amount L of the movable portions 611 to 613 becomes equal to or more than the predetermined movable threshold 332, the notification portion 313 notifies the informing portion that the mounting of the printing material cartridge 4 in the cartridge mounting portion 6 is completed. For example, the consumption value calculation portion 314 counts the number of times of ejection of the printing material from the head 22 to calculate the consumption value 336 indicating a consumption amount of the printing material consumed by printing. The information processing portion 315 performs various processes for managing the consumption value 336 of a specific printing material cartridge 4 and estimating whether or not the specific printing material cartridge 4 is a replacement target. At least a part of the functions of the apparatus CPU 31 may be realized by a hardware circuit.

Figure 9:
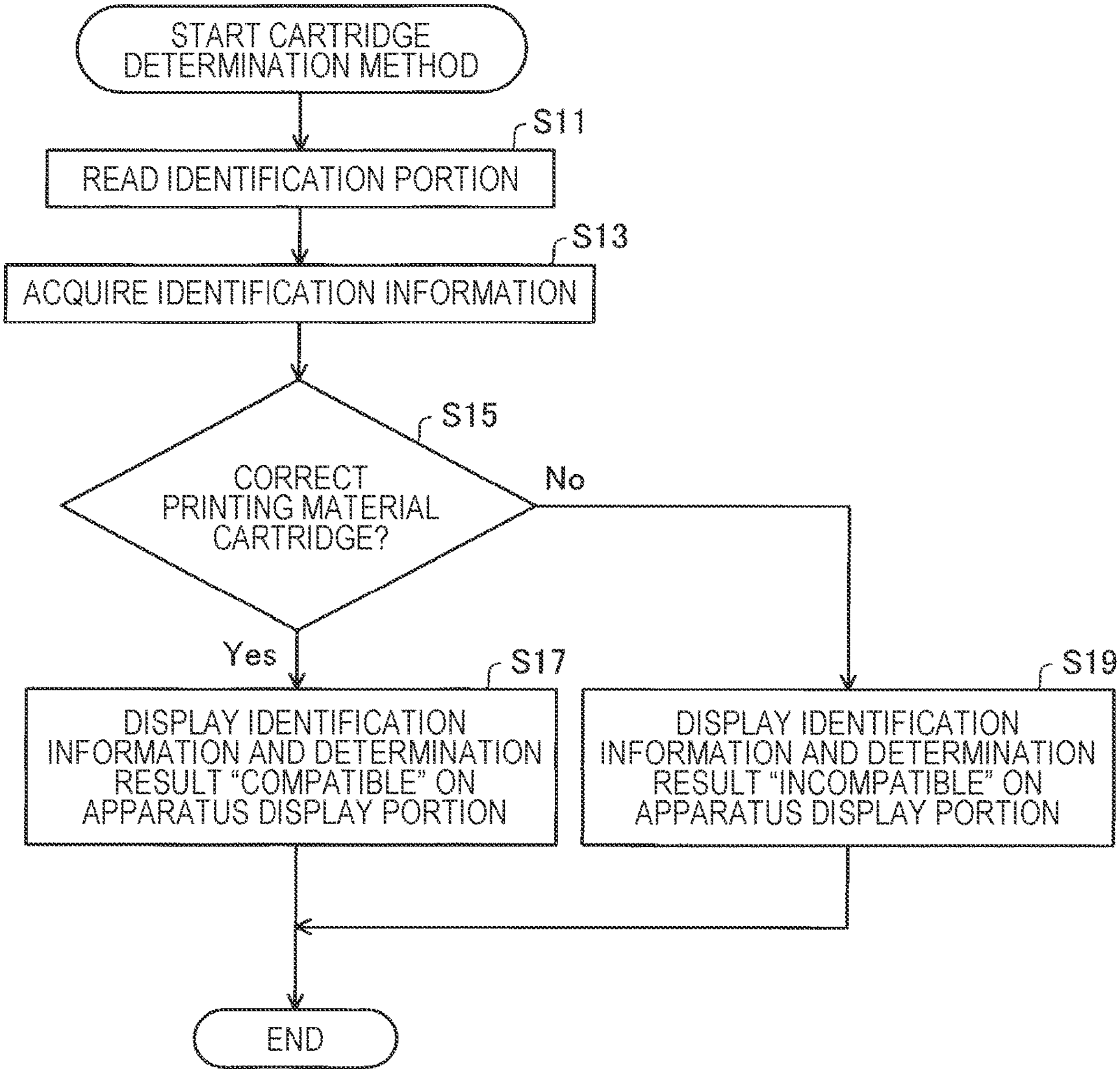
FIG. 9 is a flowchart illustrating a cartridge determination method.

FIG. 9 is a flowchart illustrating a cartridge determination method. The cartridge determination method is a method of determining whether or not the printing material cartridge 4 inserted into the cartridge mounting portion 6 is the correct printing material cartridge 4 that is compatible with the cartridge mounting portion 6, by using the identification information J obtained by reading the identification portion 45 with the apparatus reading portion 65.

First, in step S11, in the insertion process of inserting the printing material cartridge 4 into the cartridge mounting portion 6, when the distance between the identification portion 45 and the apparatus reading portion 65 in the Y direction, which is the optical axis direction DL, becomes the focal length FL of the apparatus reading portion 65, the apparatus reading portion 65 reads the identification portion 45 provided in the printing material cartridge 4. Specifically, as illustrated in FIG. 6, the apparatus reading portion 65 takes an image of the QR code as the identification portion 45. Then, for example, the apparatus reading portion 65 optically reads the identification portion 45 by receiving the taken image of the identification portion 45 and performing binarization processing thereon.

Next, in step S13 illustrated in FIG. 9, the apparatus reading portion 65 analyzes the read identification portion 45 to acquire the identification information J. Specifically, the apparatus reading portion 65 acquires the identification information J as original data recorded on the identification portion 45, for example, by decoding a code included in the binarized image obtained by performing the binarization processing on the taken image according to a predetermined code standard. At least a part of the functions of the apparatus reading portion 65 may be performed by the main control device 3.

Next, in step S15, the compatibility determination portion 312 determines whether or not the printing material cartridge 4 is compatible with the cartridge mounting portion 6 by using the identification information J. Specifically, the compatibility determination portion 312 acquires the identification information J acquired by the apparatus reading portion 65 via the apparatus communication portion 34. Then, for example, the compatibility determination portion 312 determines whether or not the printing material cartridge 4 inserted into the cartridge mounting portion 6 is the correct printing material cartridge 4 that is compatible with the cartridge mounting portion 6, by comparing the acquired identification information J to the compatibility database 331. The compatibility database 331 referred to here is a collection of data indicating the correct type of the printing material cartridge 4 that is compatible with the cartridge mounting portion 6, and is, for example, a database in which a product number of the printing apparatus 10 and the model number of the printing material cartridge 4 that is compatible with the printing apparatus 10 are associated with each other. For example, the compatibility determination portion 312 checks whether or not the model number of the printing material cartridge 4 included in the acquired identification information J matches the model number of the printing material cartridge 4 associated with the product number of the printing apparatus 10 in the compatibility database 331. When the model number of the printing material cartridge 4 in the acquired identification information J and the model number of the printing material cartridge 4 in the compatibility database 331 match each other, the compatibility determination portion 312 determines that the printing material cartridge 4 inserted into the cartridge mounting portion 6 is the correct printing material cartridge 4 that is compatible with the cartridge mounting portion 6.

When "Yes" is determined in step S15, that is, when it is determined that the printing material cartridge 4 inserted into the cartridge mounting portion 6 is the correct printing material cartridge 4 that is compatible with the cartridge mounting portion 6, the compatibility determination portion 312 performs step S17. In step S17, the compatibility determination portion 312 causes the apparatus display portion 15 to display that the identification information J and a determination result K in step S15 are compatible with each other. Thereafter, the printing apparatus 10 can perform a normal printing operation. Contrary to this, when "No" is determined in step S15, that is, when it is determined that the printing material cartridge 4 inserted into the cartridge mounting portion 6 is an incompatible printing material cartridge 4 that is not compatible with the cartridge mounting portion 6, the compatibility determination portion 312 performs step S19. Thereafter, the printing operation by the printing apparatus 10 is stopped.

Figure 10:
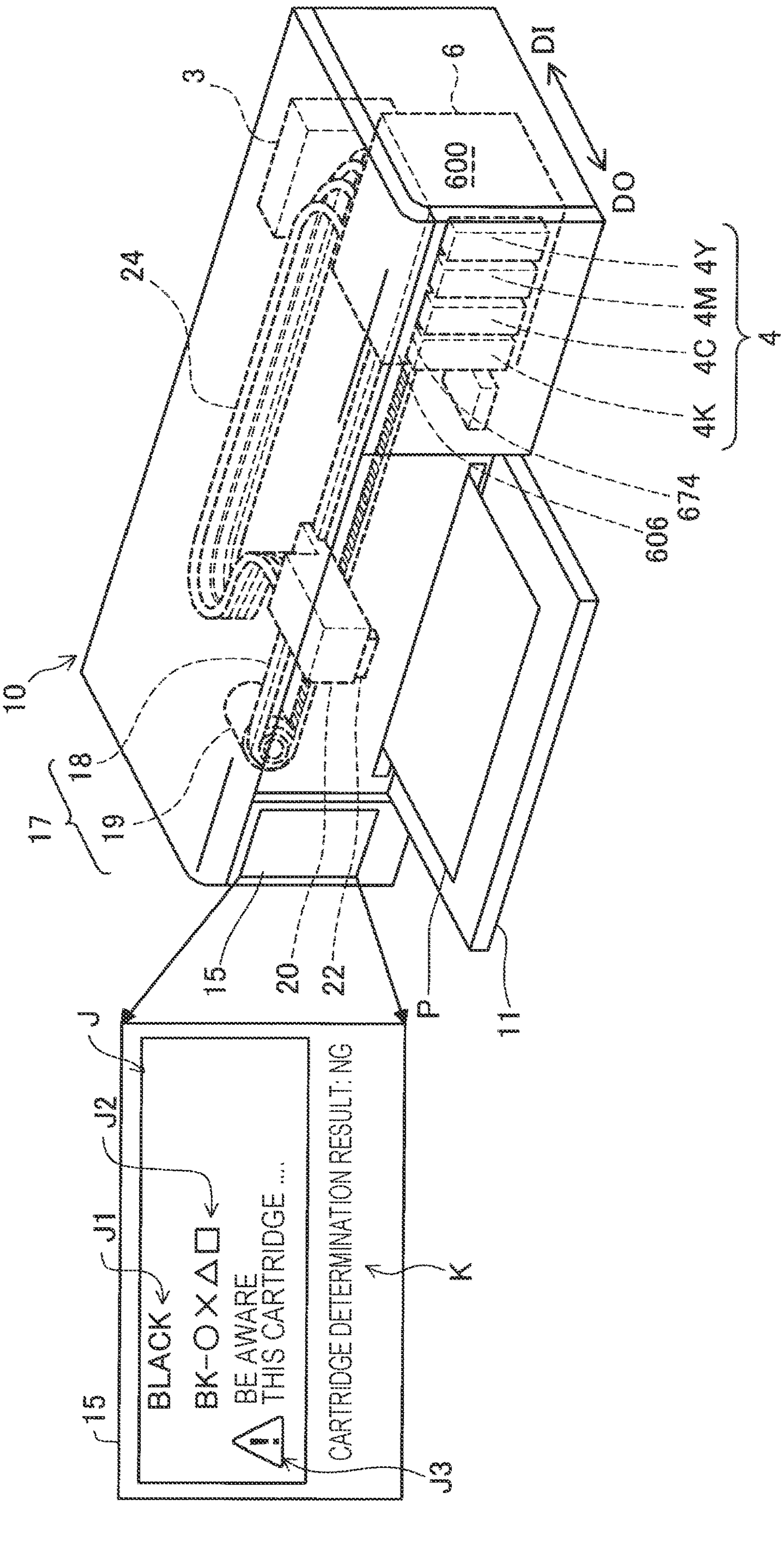
FIG. 10 is a view illustrating an example of a display image of an apparatus display portion in step S19.

FIG. 10 is a view illustrating an example of a display image of the apparatus display portion 15 in step S19. In step S19 illustrated in FIG. 9, the compatibility determination portion 312 causes the apparatus display portion 15 to display that the identification information J and the determination result K in step S15 are not compatible with each other. In the example illustrated in FIG. 10, as the identification information J, an ink color J1 of the printing material cartridge 4 inserted into the cartridge mounting portion 6, a model number J2 of the printing material cartridge 4, and a precautions J3 for the user are displayed on the apparatus display portion 15. In addition, in order to indicate that the printing material cartridge 4 inserted into the cartridge mounting portion 6 is an incompatible printing material cartridge 4 that is not compatible with the cartridge mounting portion 6, regarding the determination result K in step S15, "cartridge determination result: NG" is displayed. Types and display forms of the information displayed on the apparatus display portion 15 are not limited thereto. When it is determined that the printing material cartridge 4 that is not compatible with the cartridge mounting portion 6 is inserted, the compatibility determination portion 312 may perform control such that the printing operation is not performed. Accordingly, in a case of a configuration in which only an appropriate printing material cartridge 4 can be mounted in the cartridge mounting portion 6 by structural engagement between the cartridge-side engagement portion 420 and the apparatus-side engagement portion 620, for example, the following situation can be prevented. Even when structures of the cartridge-side engagement portion 420 and the apparatus-side engagement portion 620 are modified for some reason and a function of distinguishing the compatibility of the printing material cartridge 4 with the cartridge mounting portion 6 does not work, a situation in which printing is performed by the printing material cartridge 4 with incorrect ink color can be prevented.

By performing each step from step S11 to step S19, the user can check various types of information such as the identification information J of the printing material cartridge 4 inserted into the cartridge mounting portion 6 by visually recognizing a display content of the apparatus display portion 15. Furthermore, by visually recognizing the display content of the apparatus display portion 15, the user can check whether or not the printing material cartridge 4 inserted into the cartridge mounting portion 6 is the correct printing material cartridge 4 that is compatible with the cartridge mounting portion 6. Therefore, it is possible to omit attaching a label or circuit substrate in which the identification information J is described and stored, to the case 40 of the printing material cartridge 4, and it is possible to reduce an environmental burden on recycling of a recovered printing material cartridge 4.

Figure 11:
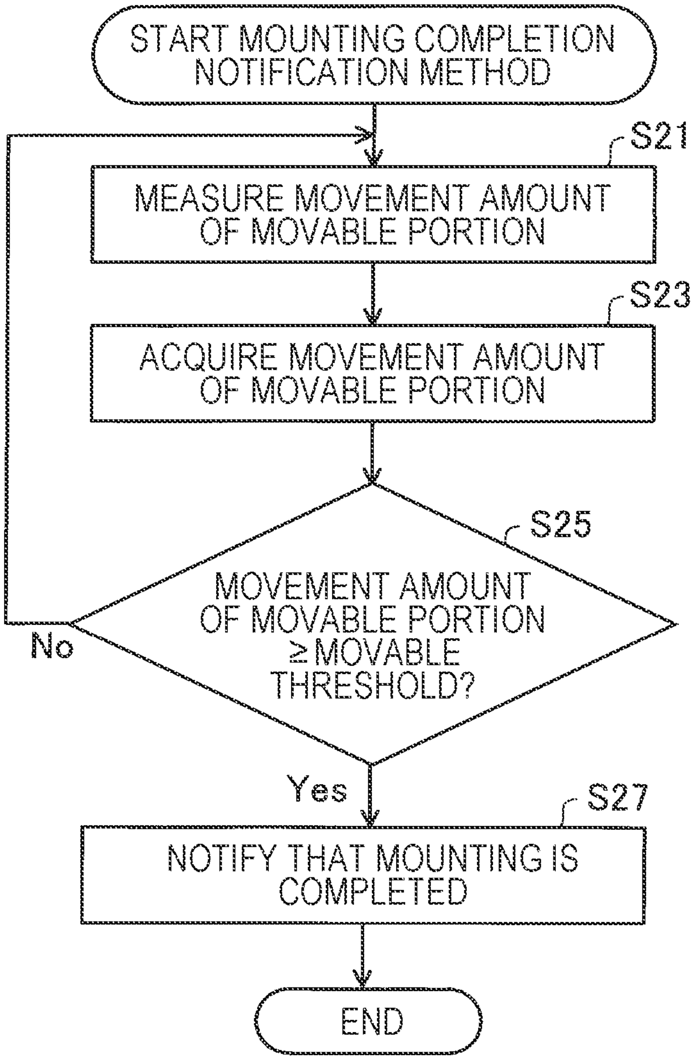
FIG. 11 is a flowchart illustrating a mounting completion notification method.

FIG. 11 is a flowchart illustrating a mounting completion notification method. The mounting completion notification method is a method of notifying that the mounting of the printing material cartridge 4 in the cartridge mounting portion 6 is completed when the movement amount L of the movable portions 611 to 613 is equal to or more than the predetermined movable threshold 332.

First, in step S21, the measurement mechanism 619 measures the movement amount L of the movable portions 611 to 613 in the insertion direction DI. In the examples illustrated in FIGS. 6 and 7, the movement amount L of the movable portions 611 to 613 in the insertion direction DI corresponds to a distance L obtained by subtracting a second distance L2 illustrated in FIG. 7 from a first distance L1 illustrated in FIG. 6. The first distance L1 refers to a dimension L1 in the Y direction of the movable portion 611 to 613 exposed from the base portion 630 in a state in which the movable portions 611 to 613 are not pressed by the protruding portion 410, that is, in a state in which the movable portions 611 to 613 and the protruding portion 410 are not in contact with each other. The second distance L2 refers to a dimension L2 in the Y direction of the movable portions 611 to 613 exposed from the base portion 630 in a state in which the movable portions 611 to 613 are pressed by the protruding portion 410.

Next, in step S23 illustrated in FIG. 11, the notification portion 313 acquires the movement amount L in the insertion direction DI of the movable portions 611 to 613 measured by the measurement mechanism 619 via the apparatus communication portion 34. Next, in step S25, the notification portion 313 compares the acquired movement amount L of the movable portions 611 to 613 in the insertion direction DI to the predetermined movable threshold 332. When "Yes" is determined in step S25, that is, when the movement amount L of the movable portions 611 to 613 in the insertion direction DI is equal to or more than the movable threshold 332, the notification portion 313 performs step S27. Contrary to this, when "No" is determined in step S25, that is, when the movement amount L of the movable portions 611 to 613 in the insertion direction DI is less than the movable threshold 332, the apparatus CPU 31 returns to step S21 and repeatedly performs each step from step S21 to step S25.

In step S27, the notification portion 313 notifies the user that the mounting of the printing material cartridge 4 in the cartridge mounting portion 6 is completed, that is, the printing material cartridge 4 inserted into the cartridge mounting portion 6 enters the mounting completed state. For example, the notification portion 313 notifies the user that the mounting of the printing material cartridge 4 inserted into the cartridge mounting portion 6 is completed by causing the apparatus display portion 15 to display a display indicating that the mounting of the printing material cartridge 4 in the cartridge mounting portion 6 is completed. In addition, for example, the notification portion 313 may notify the user that the mounting of the printing material cartridge 4 inserted in the cartridge mounting portion 6 is completed by generating a notification sound from a speaker (not illustrated) as the informing portion.

Here, when the mounting of the printing material cartridge 4 in the cartridge mounting portion 6 is not completed, the coupling between the printing material supply portion 43 and the printing material introduction portion 63 is not completed. Therefore, when printing is started before the mounting of the printing material cartridge 4 is completed, for example, air is drawn from the printing material introduction portion 63 to generate air bubbles in the ink as the printing material remaining in the tube 24, so that there is concern that printing defects such as missing dots may occur. In addition, when printing is started before the mounting of the printing material cartridge 4 is completed, the printing material may be supplied from the printing material accommodation portion 450 in a state in which the printing material introduction portion 63 is not introduced into the printing material supply portion 43. As described above, when printing is started when the printing material cartridge 4 is halfway inserted into the cartridge mounting portion 6, there is concern that the printing material may not be supplied to the printing material introduction portion 63 and may leak from the supply port 431 of the printing material cartridge 4. In the insertion process of inserting the printing material cartridge 4 into the cartridge mounting portion 6, when the printing material leaks from the supply port 431 before the mounting of the printing material cartridge 4 is completed, there is concern that the accommodation chamber 600 may be contaminated with the printing material. Furthermore, in the insertion process of inserting the printing material cartridge 4 into the cartridge mounting portion 6, when the printing material leaks from the supply port 431 before the mounting of the printing material cartridge 4 is completed, there is concern that the leaked printing material reaches the printing material introduction portion 63, into which another type of printing material is introduced, causing color mixing.

Contrary to this, in the present embodiment, by performing each step from step S21 to step S27, the user can check whether or not the mounting of the printing material cartridge 4 in the cartridge mounting portion 6 is completed. Therefore, the user can start the printing operation in the printing system 1 after confirming that the mounting of the printing material cartridge 4 in the cartridge mounting portion 6 is completed. Therefore, it is possible to reduce a probability that a problem such as a printing defect occurs when the printing material cartridge 4 is mounted. In addition, since the printing system 1 can notify the user whether or not an appropriate printing material cartridge 4 is mounted, the user can be given a sense of relief. Furthermore, when an appropriate printing material cartridge 4 is not mounted, the main control device 3 of the printing apparatus 10 may perform control such that the printing operation is stopped.

Figure 12:
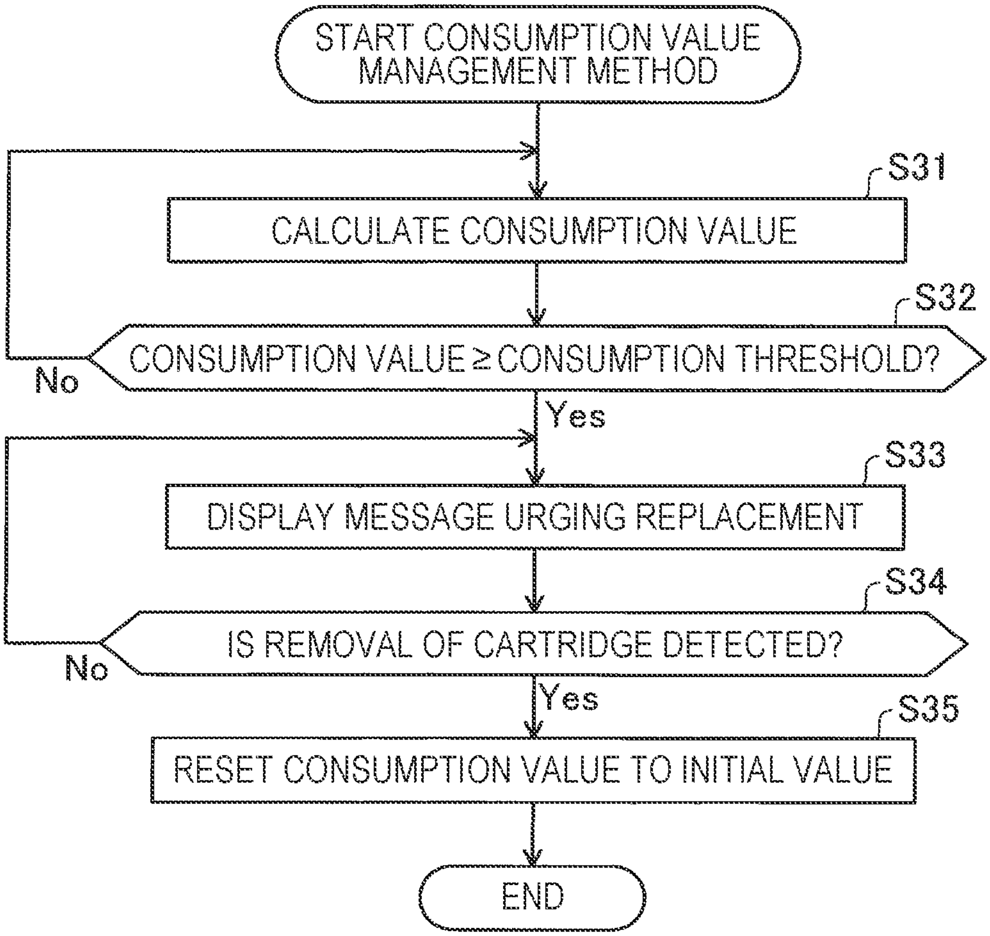
FIG. 12 is a flowchart illustrating a consumption value management method.

FIG. 12 is a flowchart illustrating a consumption value management method. The consumption value management method is a method of managing the consumption value 336 of the specific printing material cartridge 4. In the present embodiment, the apparatus storage portion 33 illustrated in FIG. 8 stores the identification information J and the consumption value 336 indicating the consumption amount of the printing material consumed by printing in association with each other.

First, in step S31, the consumption value calculation portion 314 calculates the consumption value 336. In the present embodiment, the consumption value calculation portion 314 is a software counter that manages the consumption amount of the printing material in the printing material accommodation portion 450 by using a discharge amount of the printing material discharged from the head 22 by printing. That is, in the present embodiment, the consumption value calculation portion 314 manages a remaining amount of the printing material accommodated in the printing material accommodation portion 450 by using the consumption value 336 indicating the discharge amount of the printing material. For example, whenever the printing material is discharged from the head 22, the consumption value calculation portion 314 adds the discharge amount of the printing material for each discharge to the consumption value 336. In other words, the consumption value calculation portion 314 calculates a value obtained by multiplying the discharge amount of the printing material for each discharge by the number of times the printing material is discharged from the head 22, as the consumption value 336. That is, in the present embodiment, the consumption value 336 is a software count value indicating the discharge amount of the printing material from the time when the counting is started to the current time. As illustrated in FIG. 1, when the plurality of printing material cartridges 4 are respectively mounted in the cartridge mounting portions 6, the consumption value calculation portion 314 counts the consumption value 336 for each of the plurality of printing material cartridges 4.

Next, in step S32 illustrated in FIG. 12, the information processing portion 315 compares the calculated consumption value 336 to the consumption threshold 333 stored in advance in the apparatus storage portion 33. The consumption threshold 333 is, for example, a value that is a predetermined ratio to a maximum value of the software count value. For example, 95% of the maximum value of the software count value calculated from a printing material accommodation amount of the printing material cartridge 4 corresponding to the identification information J may be set as the consumption threshold 333 assuming that a substantial ink remaining amount is small. When “Yes” is determined in step S32, that is, when the calculated consumption value 336 is equal to or more than the predetermined consumption threshold 333, step S33 is performed. Contrary to this, when “No” is determined in step S32, that is, when the calculated consumption value 336 is less than the consumption threshold 333, the apparatus CPU 31 returns to step S31 and repeatedly performs steps S31 and S32 in this order.

In step S33, the information processing portion 315 causes the apparatus display portion 15 to display a message or the like urging replacement of the printing material cartridge 4 having the consumption value 336 equal to or more than the consumption threshold 333. That is, when the consumption value 336 is equal to or more than the consumption threshold 333, the information processing portion 315 causes the apparatus display portion 15 to display a display urging replacement as the printing material of the printing material cartridge 4 mounted in the cartridge mounting portion 6 is consumed by a predetermined ratio or more and the remaining amount of the printing material approaches zero. In addition, the information processing portion 315 may notify the user that the printing material cartridge 4 has reached a replacement time, for example, by generating a voice message urging the replacement of the printing material cartridge 4 from a speaker as the informing portion. Furthermore, the information processing portion 315 may perform control such that the printing operation is stopped in order to prevent printing blank pages. In addition, step S33 is not an essential step in the consumption value management method.

The information processing portion 315 performs step S35 when removal of the printing material cartridge 4 is detected in step S34 after determining "Yes" in step S32. That is, when "Yes" is determined in step S34, the information processing portion 315 performs step S35. Contrary to this, when "No" is determined in step S34, the information processing portion 315 returns to step S33 and repeatedly performs step S33 and step S34 in this order. For example, the information processing portion 315 detects the removal of the printing material cartridge 4, for example, by using the movement amount L of the movable portions 611 to 613 illustrated in FIG. 7 in the insertion direction DI. In addition, for example, the information processing portion 315 may detect the removal of the printing material cartridge 4 by whether or not the identification portion 45 can be read by the apparatus reading portion 65. In this case, for example, the information processing portion 315 causes the apparatus reading portion 65 to read the identification portion 45 at predetermined time intervals even after the mounting of the printing material cartridge 4 in the cartridge mounting portion 6 is completed. When the apparatus reading portion 65 performs the reading, when the reading is not completed and the identification portion 45 cannot be acquired, the information processing portion 315 detects the removal of the printing material cartridge 4 as the printing material cartridge 4 is not present in the accommodation chamber 600 of the cartridge mounting portion 6.

In step S35, the information processing portion 315 resets the consumption value 336, which is the consumption value 336 stored in the apparatus storage portion 33 and corresponds to the identification information J, to an initial value. At this time, the initial value of the consumption value 336 may be zero or any predetermined value other than zero. Accordingly, it is possible to avoid a situation in which, when the printing material cartridge 4 corresponding to the identification information J is refilled with the printing material and is mounted in the printing apparatus 10 again, it is determined that there is no remaining amount of the printing material and printing is not performed, and it is possible to continue to use the printing apparatus 10. That is, even when the used printing material cartridge 4 that is recovered is refilled and is used for printing again, the printing apparatus 10 can appropriately manage the consumption value 336 of the printing material cartridge 4 mounted in the past. Accordingly, the printing material cartridge 4 can be appropriately reused.

The apparatus storage portion 33 as the storage portion may further store the reading frequency 338 in association with the identification information J. The reading frequency 338 referred to here is data indicating the number of times the apparatus reading portion 65 reads the identification portion 45 whenever the printing material cartridge 4 is inserted into the cartridge mounting portion 6. That is, the reading frequency 338 is equal to the number of times the printing material cartridge 4 is inserted into and removed from the cartridge mounting portion 6. The identification information J and the reading frequency 338 are stored in the apparatus storage portion 33 whenever the apparatus reading portion 65 reads the identification portion 45 as the printing material cartridge 4 is inserted into the cartridge mounting portion 6.

Figure 13:
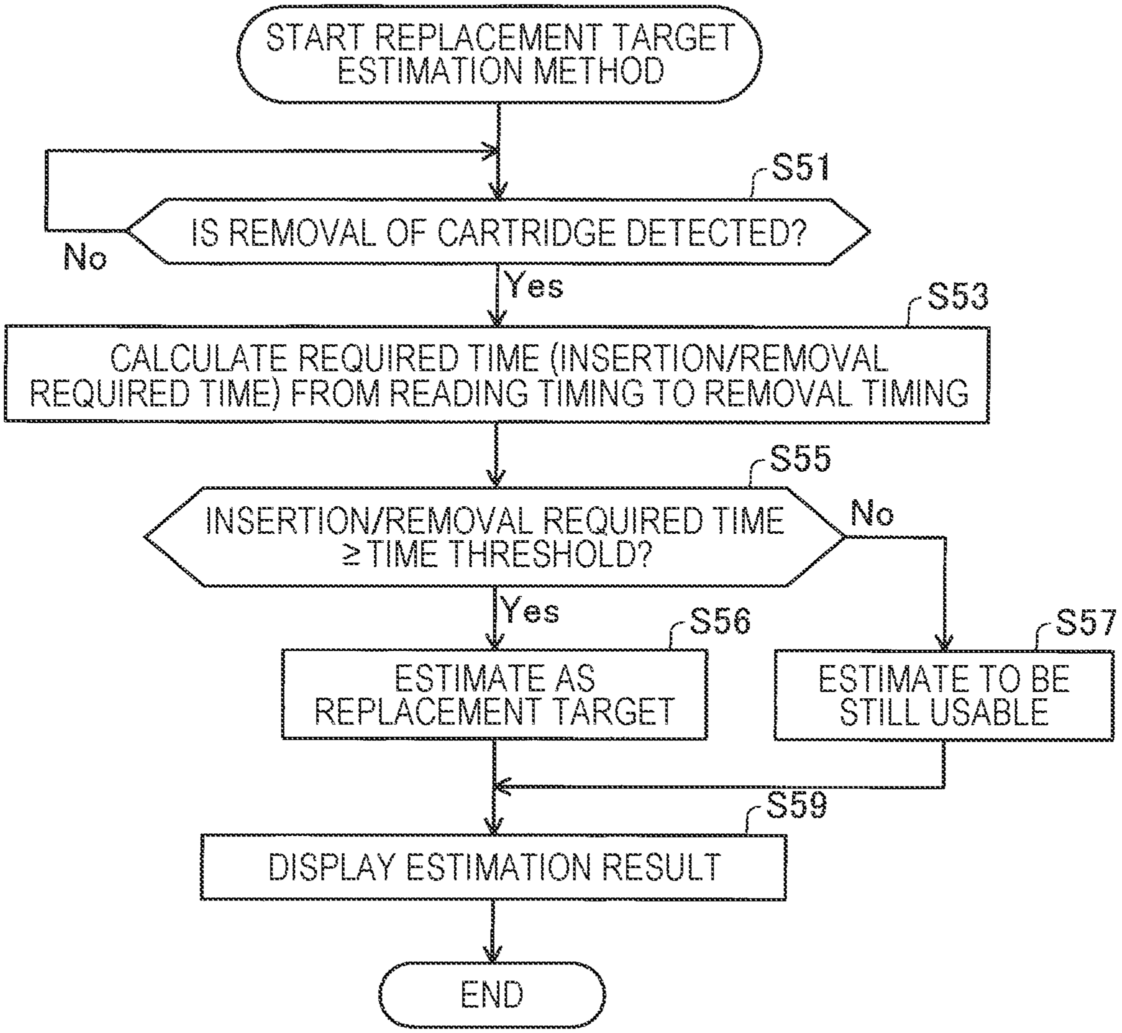
FIG. 13 is a flowchart illustrating a replacement target estimation method.

FIG. 13 is a flowchart illustrating a replacement target estimation method. The replacement target estimation method is a method of estimating whether or not the printing material cartridge 4 removed from the cartridge mounting portion 6 is a replacement target. In the present embodiment, as illustrated in FIG. 8, the apparatus storage portion 33 as the storage portion stores the identification information J and the reading timing 339 of the printing material cartridge 4 in association with each other. The reading timing 339 referred to here is data indicating a timing at which the apparatus reading portion 65 reads the identification portion 45 whenever the printing material cartridge 4 is inserted into the cartridge mounting portion 6. The reading timing 339 is, for example, data indicating a date (year, month, and day) and a time (hour, minute, and second) at a time when the apparatus reading portion 65 reads the identification portion 45. The reading timing 339 is stored in the apparatus storage portion 33 whenever the apparatus reading portion 65 reads the identification portion 45 as the printing material cartridge 4 is inserted into the cartridge mounting portion 6.

As illustrated in FIG. 13, first, in step S51, the information processing portion 315 detects that the printing material cartridge 4 has been removed from the cartridge mounting portion 6. When "Yes" is determined in step S51, that is, when it is detected that the printing material cartridge 4 has been removed from the cartridge mounting portion 6, the information processing portion 315 performs step S53. Contrary to this, when "No" is determined in step S51, step S51 is repeatedly performed until the removal of the printing material cartridge 4 is detected.

In step S53, the information processing portion 315 refers to the reading timing 339 stored in the apparatus storage portion 33, which is the reading timing 339 of the printing material cartridge 4 of which the removal was detected in step S51. Then, the information processing portion 315 calculates an insertion/removal required time, which is a required time from the reading timing 339 to a removal timing at which the printing material cartridge 4 is removed from the cartridge mounting portion 6 after the reading timing 339. The removal timing referred to here is, for example, a timing at which the information processing portion 315 detects the removal of the printing material cartridge 4.

Next, in step S55, the information processing portion 315 compares the insertion/removal required time calculated in step S53 to the predetermined time threshold 334. The time threshold 334 is, for example, the shorter of either a life time of the printing material or an estimated required time until the consumption value 336 of the printing material reaches the consumption threshold 333. The life time of the printing material referred to here refers to a time from a time when the printing material accommodated in the printing material accommodation portion 450 is manufactured to a time when an expiration date is reached. The estimated required time refers to a time from a use start time of the printing material cartridge 4 to a time when the consumption value 336 of the printing material becomes equal to or more than the consumption threshold 333 when the printing system 1 is used at a normal frequency of use. In other words, the estimated required time is a time from after the use of the printing material cartridge 4 is started to until the remaining amount of the printing material of the printing material accommodation portion 450 approaches zero and replenishment of the printing material accommodation portion 450 with the printing material or the replacement of the printing material accommodation portion 450 is necessary.

In step S55, when "Yes" is determined in step S55, that is, when the insertion/removal required time is equal to or more than the time threshold 334, the information processing portion 315 estimates that the printing material cartridge 4 of which the removal was detected as the replacement target in step S56. Contrary to this, when "No" is determined in step S55, that is, when the insertion/removal required time is less than the time threshold 334, the information processing portion 315 estimates that the printing material cartridge 4 of which the removal was detected is still usable without replacement in step S57. Then, in step S59, the information processing portion 315 informs the informing portion of estimation results shown in steps S56 and S57. In the present embodiment, when the insertion/removal required time is equal to or more than the predetermined time threshold 334, the information processing portion 315 causes the apparatus display portion 15 to display a message to the effect that the removed printing material cartridge 4 has reached the replacement time. In this case, even when the same printing material cartridge 4 is mounted again in the cartridge mounting portion 6, control may be performed so that the printing operation is not performed. On the other hand, when the insertion/removal required time is less than the time threshold 334, for example, the information processing portion 315 causes the apparatus display portion 15 to display a message to the effect that the removed printing material cartridge 4 is still usable. In addition, when the insertion/removal required time is less than the time threshold 334, for example, the information processing portion 315 may cause the apparatus display portion 15 to display a message urging remounting of the removed printing material cartridge 4 in the cartridge mounting portion 6.

As described above, by performing each step from step S51 to step S59, the printing system 1 can estimate whether or not the removed printing material cartridge 4 is the replacement target. That is, the printing system 1 can estimating whether or not the removed printing material cartridge 4 is the replacement target by storing the identification information J and the timing at which the printing material cartridge 4 is inserted into and removed from the cartridge mounting portion 6 in association with each other. Furthermore, by displaying the estimation result on the apparatus display portion 15, the user can easily grasp whether or not the removed printing material cartridge 4 is the replacement target. Accordingly, the user can replace the printing material cartridge 4 in consideration of the expiration date of the printing material and the replacement time at the normal frequency of use. Therefore, the printing system 1 can suppress deterioration in print quality due to the printing material cartridge 4 reaching the replacement time. Therefore, the printing system 1 can utilize the estimation result of whether or not the printing material cartridge 4 is the replacement target for maintaining and managing the quality of the printing material cartridge 4.

When the printing material cartridge 4 is inserted into and removed from the cartridge mounting portion 6 a plurality of times, the information processing portion 315 may set the insertion/removal required time to a required time from the reading timing 339 at which the specific printing material cartridge 4 is first read to a final removal timing. That is, in this case, the information processing portion 315 may estimate whether or not the printing material cartridge 4 is the replacement target by comparing a cumulative time from an initial reading timing 339 of the specific printing material cartridge 4 to the time threshold 334.

Figure 14:
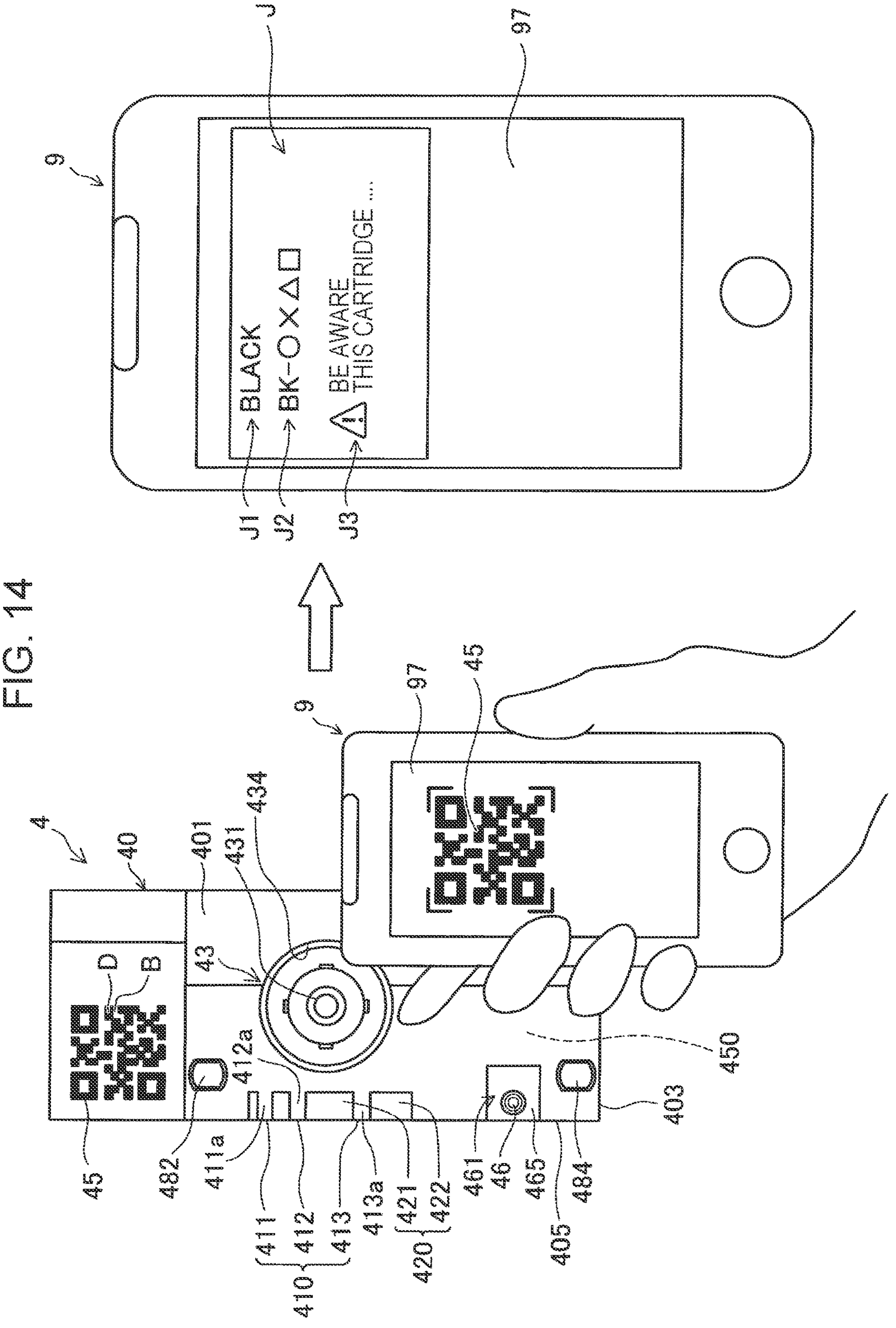
FIG. 14 is a diagram illustrating an example of a display image of a terminal display portion.

A-6. Method of Checking Identification Information by Portable Terminal:

FIG. 14 is a diagram illustrating an example of an image of the identification portion 45 read by the portable terminal 9 and a display image of the terminal display portion 97. The identification portion 45 is further read by the portable terminal 9, so that the identification information J is displayed on the terminal display portion 97 of the portable terminal 9. As illustrated in FIG. 8, the portable terminal 9 includes the terminal display portion 97, a terminal reading portion 95, and a terminal control device 90. As illustrated in FIG. 14, the terminal display portion 97 is, for example, a display of a smartphone or a tablet terminal. The terminal reading portion 95 optically reads the identification portion 45 of the printing material cartridge 4. In the present embodiment, the terminal reading portion 95 is a camera provided in a smartphone or a tablet terminal.

As illustrated in FIG. 8, the terminal control device 90 includes a terminal communication portion 94, a terminal storage portion 93, and a terminal CPU 91. The terminal control device 90 is communicatively connected to the terminal display portion 97, the terminal reading portion 95, and an external device such as the printing apparatus 10 via the terminal communication portion 94. The terminal storage portion 93 stores various programs and the like that control an operation of the portable terminal 9. The terminal storage portion 93 includes, for example, a RAM, a ROM, and a rewritable non-volatile memory. The terminal CPU 91 functions as a terminal operation control portion 911, a terminal acquisition portion 913, and a display control portion 915 by deploying various programs stored in the terminal storage portion 93. The terminal operation control portion 911 controls the operation of the portable terminal 9. The terminal acquisition portion 913 acquires the identification information J by analyzing the identification portion 45 read by the terminal reading portion 95. The display control portion 915 causes the terminal display portion 97 to display various types of information such as the identification information J acquired by the terminal acquisition portion 913.

According to the first embodiment, memory information in a circuit substrate and identification information displayed on a label can be formed at the printing material cartridge 4 as one common identification portion 45 for being used for each purpose. The memory information in the circuit substrate referred to here is, for example, information indicating a state of the printing material cartridge 4 that changes as the printing material cartridge 4 is used, such as the consumption value of 336 or the like. In addition, the identification information displayed on the label is, for example, the ink color J1 or the model number J2 of the printing material cartridge 4, or the cartridge ID for identifying the plurality of printing material cartridges 4. That is, according to the first embodiment, the information in the memory and the information indicated by the label can be formed as the identification portion 45, which is one member. In this manner, various types of information regarding the printing material cartridge 4 can be integrated in the identification portion 45 as image information. Accordingly, each type of information can be read integrally.

In addition, according to the first embodiment, as illustrated in FIG. 6, in the insertion process of inserting the printing material cartridge 4 into the cartridge mounting portion 6, the apparatus reading portion 65 can acquire the identification information J by optically reading and analyzing the identification portion 45 on which the identification information J of the printing material cartridge 4 is recorded. Then, the compatibility determination portion 312 can notify the user of the identification information J by causing the apparatus display portion 15 to display the acquired identification information J. In this manner, the circuit substrate on which the identification information J is recorded can be replaced by the identification portion 45 on which the identification information J is recorded, without attaching the circuit substrate to the case 40 forming the outer covering of the printing material cartridge 4. Accordingly, the used printing material cartridge 4 can be reused without requiring a work of removing the circuit substrate from the printing material cartridge 4. Therefore, the printing material cartridge 4 can be easily reused.

In addition, according to the first embodiment, as illustrated in FIG. 14, the user can check various types of information such as the identification information J of the printing material cartridge 4 and the precautions J3 for use by optically reading the identification portion 45 of the printing material cartridge 4 by using the portable terminal 9. In addition, for example, various types of information that have been updated as appropriate may be displayed through communication with a server apparatus 8 on which the identification information J corresponding to the read identification portion 45 is stored. In this manner, various types of information such as the identification information J of the printing material cartridge 4 can be presented to the user without attaching a label describing various types of information including the identification information J to the case 40 forming the outer covering of the printing material cartridge 4. Accordingly, when the used printing material cartridge 4 is reused, a work of removing the label is not required, so that the printing material cartridge 4 can be reused more easily.

In addition, according to the first embodiment, the user can check the mounting procedure of the printing material cartridge 4 in advance by optically reading the identification portion 45 of the printing material cartridge 4 by using the portable terminal 9. Accordingly, the user can appropriately mount the printing material cartridge 4 in the cartridge mounting portion 6 while checking the mounting procedure of the printing material cartridge 4 displayed on the terminal display portion 97. Therefore, the printing system 1 can improve user convenience. It is desirable for the terminal display portion 97 to display not only the mounting procedure of the printing material cartridge 4 but also a recovery procedure when the printing material cartridge 4 is used up.

In addition, according to the first embodiment, as illustrated in FIG. 14, the precautions J3 can be displayed on the terminal display portion 97 together with the identification information J. Accordingly, the user can be more reliably notified of the precautions J3 for use of the printing material cartridge 4.

In addition, according to the first embodiment, as illustrated in FIG. 14, the display control portion 915 can cause the terminal display portion 97 to display the precautions J3 for the user who uses the printing material cartridge 4 as the identification information J is read by the terminal reading portion 95. Accordingly, the user can check the precautions J3 for use of the printing material cartridge 4 by a simple operation.

In addition, according to the first embodiment, as illustrated in FIG. 5, the identification portion 45 is formed at the printing material cartridge 4 by laser printing. In this manner, the identification portion 45 can be formed without attaching another member such as a label to the case 40 forming the outer covering of the printing material cartridge 4. That is, the printing material cartridge 4 can be made without a label. Accordingly, when the used printing material cartridge 4 is reused, the work of removing the label is not required, so that the printing material cartridge 4 can be reused even more easily. Furthermore, when the identification portion 45 is printed on the printing material cartridge 4 by laser printing, the identification information J can be accurately read by the apparatus reading portion 65 without deterioration even when the printing material cartridge 4 is reused many times.

In addition, according to the first embodiment, by providing the identification portion 45 instead of the circuit substrate or label on which the identification information J is recorded, the circuit substrate attached to the case 40 forming the outer covering of the printing material cartridge 4 can be omitted, or the label attached to the case 40 can be miniaturized or omitted. Furthermore, by reading the identification portion 45 with the apparatus reading portion 65 and the terminal reading portion 95, the compatibility of the printing material cartridge 4 with respect to the cartridge mounting portion 6 and the identification information J can be easily presented to the user. Therefore, it is possible to provide the printing system 1 with reduced environmental burden without impairing the usability of the user.

In addition, according to the first embodiment, as illustrated in FIG. 6, when the distance between the identification portion 45 and the apparatus reading portion 65 in the Y direction becomes the focal length FL, the apparatus reading portion 65 can acquire the identification information J by reading the identification portion 45. Then, the compatibility determination portion 312 determines whether or not the printing material cartridge 4 inserted into the cartridge mounting portion 6 is compatible with the cartridge mounting portion 6 by using the identification information J, and as illustrated in FIG. 10, can notify the user of the identification information J and the determination result K. In this manner, the user can be notified of whether or not the printing material cartridge 4 inserted into the cartridge mounting portion 6 is the correct printing material cartridge 4 that is compatible with the cartridge mounting portion 6 before the mounting of the printing material cartridge 4 in the cartridge mounting portion 6 is completed. Therefore, the printing system 1 can quickly alert the user to the erroneous insertion of the printing material cartridge 4 in the insertion process of inserting the printing material cartridge 4 into the cartridge mounting portion 6. In addition, when the compatibility determination portion 312 determines that the printing material cartridge 4 inserted into the cartridge mounting portion 6 is not compatible with the cartridge mounting portion 6, control may be performed so that the printing operation is stopped. Accordingly, the printing system 1 can detect the erroneous insertion of the printing material cartridge 4 or stop the printing operation before the printing material introduction portion 63 is introduced into the printing material supply portion 43, so that a probability that different types of printing materials are mixed in the printing material introduction portion 63 can be reduced.

In addition, according to the first embodiment, as illustrated in FIGS. 6 and 7, the identification portion 45 is formed at a position at which the identification portion 45 can be optically read by the apparatus reading portion 65 formed inside the cartridge mounting portion 6 in the insertion process of inserting the printing material cartridge 4 into the cartridge mounting portion 6. At this time, the position at which the identification portion 45 can be read by the apparatus reading portion 65 is a position facing the apparatus reading portion 65 in the optical axis direction DL when the apparatus reading portion 65 reads the identification portion 45 in the insertion process of inserting the printing material cartridge 4 into the cartridge mounting portion 6. That is, the identification portion 45 is disposed at the position facing the apparatus reading portion 65 in the optical axis direction DL in the insertion process of inserting the printing material cartridge 4 into the cartridge mounting portion 6. In this manner, the apparatus reading portion 65 can read the identification portion 45 from the front surface. Accordingly, the apparatus reading portion 65 can more reliably read the identification portion 45. In other words, a reading accuracy of the identification portion 45 can be improved.

In addition, according to the first embodiment, as illustrated in FIG. 5, the identification portion 45 is formed at the formation surface at which the cartridge-side engagement portion 420 is formed. In this case, in the insertion process, it is possible to determine whether or not the printing material cartridge 4 is correct and is compatible with the cartridge mounting portion 6 by the presence or absence of engagement between the cartridge-side engagement portion 420 and the apparatus-side engagement portion 620, and the identification information J obtained by reading the identification portion 45 with the apparatus reading portion 65. Accordingly, the probability that the printing material cartridge 4 that is not compatible with the cartridge mounting portion 6 is mounted can be more reliably reduced.

In addition, according to the first embodiment, as illustrated in FIG. 5, the supply port 431 is formed in the formation surface at which the cartridge-side engagement portion 420 and the identification portion 45 are formed. In this manner, after determining whether or not the printing material cartridge 4 is correct and is compatible with the cartridge mounting portion 6 by both the presence or absence of engagement between the cartridge-side engagement portion 420 and the apparatus-side engagement portion 620 and the identification information J, the printing material introduction portion 63 can be introduced into the printing material supply portion 43. Accordingly, it is possible to further reduce the probability that different types of printing materials are mixed in the printing material introduction portion 63.

In addition, according to the first embodiment, the formation surface is a surface that faces the optical axis direction DL when the apparatus reading portion 65 reads the identification portion 45 in the insertion process of inserting the printing material cartridge 4 into the cartridge mounting portion 6, and is orthogonal to the optical axis direction DL. In this manner, the apparatus reading portion 65 can read the identification portion 45 from the front surface. Accordingly, the printing material introduction portion 63 can be introduced into the printing material supply portion 43 in a state in which the reading accuracy of the identification portion 45 is improved.

In addition, according to the first embodiment, as illustrated in FIGS. 6 and 7, the apparatus-side first positioning portion 682 and the apparatus-side second positioning portion 684 each extend toward the +Y direction side beyond the apparatus-side engagement portion 620. That is, the tip end portion 682*a* of the apparatus-side first positioning portion 682 and the tip end portion 684*a* of the apparatus-side second positioning portion 684 are respectively positioned on the +Y direction side from the tip end portion 621*a* of the apparatus-side first engagement portion 621 and the tip end portion 622*a* of the apparatus-side second engagement portion 622. In this manner, in the insertion process of inserting the printing material cartridge 4 into the cartridge mounting portion 6, the printing material cartridge 4 can be positioned with respect to the cartridge mounting portion 6 before the apparatus-side engagement portion 620 and the cartridge-side engagement portion 420, which will be described later, are engaged with each other. Accordingly, the apparatus-side engagement portion 620 and the cartridge-side engagement portion 420 can be more accurately engaged with each other, so that erroneous insertion of the printing material cartridge 4 can be more reliably prevented.

In addition, according to the first embodiment, as illustrated in FIGS. 10 and 14, the user can check the identification information J of the printing material cartridge 4 by both the apparatus display portion 15 and the terminal display portion 97. This is because both the apparatus reading portion 65 of the printing apparatus 10 and the terminal reading portion 95 of the portable terminal 9 can read the same identification portion 45. Accordingly, the printing system 1 can improve the user convenience and more reliably inform the user of a mounting status of the printing material cartridge 4.

In addition, according to the first embodiment, the apparatus storage portion 33 as the storage portion stores the identification information J obtained by reading the identification portion 45 with the apparatus reading portion 65 whenever the printing material cartridge 4 is inserted into the cartridge mounting portion 6. Accordingly, as illustrated in FIGS. 12 and 13, the timing at which the printing material cartridge 4 is replaced or the consumption value 336 is reset can be estimated by using the reading frequency 338 and the reading timing 339 associated with the identification information J as clues.

In addition, according to the first embodiment, as illustrated in FIG. 12, the apparatus storage portion 33 as the storage portion stores the identification information J and the consumption value 336 in association with each other. When the consumption value 336 is equal to or more than the consumption threshold 333, in a case in which the same identification information J as the identification information J stored in the apparatus storage portion 33 is acquired by reading the identification portion 45 with the apparatus reading portion 65, the consumption value 336 can be reset to the initial value. This is because, in the case where the consumption value 336 is equal to or more than the consumption threshold 333, it is determined that the printing material cartridge 4 in the identification information J is, for example, once used up, recovered, refilled with the printing material such as ink, then returned to the user, mounted in the printing apparatus 10 again. In order to increase determination accuracy, when the consumption value 336 reaches the consumption threshold 333 during the previous use, the printing apparatus 10 may urge the replacement of the printing material cartridge 4 by informing of ink level end or by stopping printing. The consumption threshold 333 as the timing at which the remaining amount of the printing material in the printing material cartridge 4 corresponding to the identification information J is exhausted is also stored. As described above, by storing the identification information J and the consumption value 336 in association with each other, the printing system 1 can reset the consumption value 336 to the initial value and correctly perform counting when the refilled printing material cartridge 4 is mounted in the same printing apparatus 10.

In addition, according to the first embodiment, the apparatus storage portion 33 as the storage portion may store the reading frequency 338 read by the apparatus reading portion 65 in association with the identification information J whenever the printing material cartridge 4 is inserted into the cartridge mounting portion 6. In this manner, the printing system 1 can newly detect the insertion of the printing material cartridge 4 into the cartridge mounting portion 6 by acquiring the identification information J of the printing material cartridge 4 inserted in the cartridge mounting portion 6 and referring to the reading frequency 338 corresponding to the identification information J.

In the present disclosure, “reuse” is a concept including refill, reuse, and recycle. The term “refill” referred to here refers to regenerating the printing material cartridge 4 so as to be reusable by supplying the printing material to the printing material accommodation portion 450 of the used printing material cartridge 4, or replacing the printing material accommodation portion 450 of the used printing material cartridge 4. The term "reuse" refers to repeatedly reusing at least a portion of components in the used printing material cartridge 4. The term "recycle" refers to recycling at least a portion of the components of the used printing material cartridge 4 by using the portion as a raw material or an energy source.

B. Second Embodiment

Figure 15:
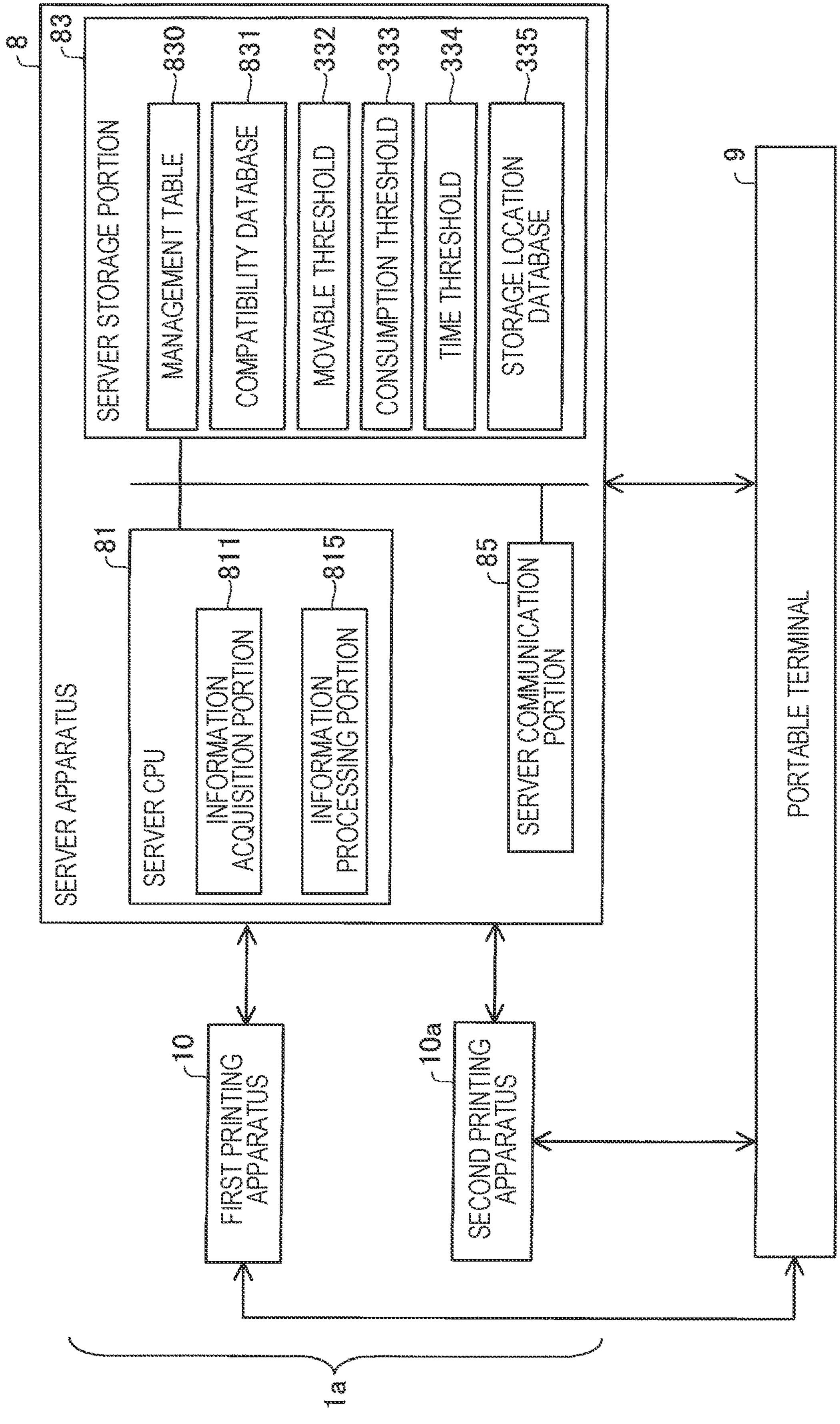
FIG. 15 is a block diagram illustrating a schematic configuration of a printing system in a second embodiment.

B-1. Configuration and Function of Printing System in Second Embodiment:

FIG. 15 is a block diagram illustrating a schematic configuration of a printing system 1*a* and the portable terminal 9 that can communicate with the printing system 1*a* in a second embodiment. The printing system 1*a* includes a first printing apparatus 10, a second printing apparatus 10*a*, and a server apparatus 8 communicatively connected to the printing apparatuses 10 and 10*a*. In the present embodiment, various types of information of the printing material cartridge 4 including the identification information J and various thresholds 332 to 334 are stored and managed in the server apparatus 8. In addition to the identification information J, the various types of information of the printing material cartridge 4 referred to here include, for example, the consumption value 336, the reading frequency 338, and the reading timing 339. Therefore, various types of information of the printing material cartridge 4 and various thresholds 332 to 334 stored in the apparatus storage portion 33 in the first embodiment are stored in the server apparatus 8 instead of the apparatus storage portion 33. Other configurations of the first printing apparatus 10 and the second printing apparatus 10*a* are the same as those of the first embodiment illustrated in FIG. 8. In addition, the portable terminal 9 has the same configuration as that of the first embodiment illustrated in FIG. 8. As illustrated in FIG. 15, the portable terminal 9 is communicatively connected to the first printing apparatus 10, the second printing apparatus 10*a*, and an external device such as the server apparatus 8. The same configurations as those in the first embodiment will be given the same reference numerals, and descriptions thereof will be omitted.

The server apparatus 8 is, for example, a cloud server. The server apparatus 8 manages various types of information of the printing material cartridge 4 attached to and detached from the cartridge mounting portion 6 of the first printing apparatus 10 and the second printing apparatus 10*a* for each printing material cartridge 4. Specifically, various types of information of the printing material cartridge 4 acquired by each of the first printing apparatus 10 and the second printing apparatus 10*a* are output to the server apparatus 8 and are managed by the server apparatus 8. Then, the server apparatus 8 provides various types of information of the printing material cartridge 4 to the external devices 9, 10, and 10*a* in response to a request from an external device such as the first printing apparatus 10, the second printing apparatus 10*a*, and the portable terminal 9. Furthermore, in response to a request from an external device such as the first printing apparatus 10, the second printing apparatus 10*a*, and the portable terminal 9, the server apparatus 8 provides various thresholds 332 to 334 and databases 335 and 831 stored in a server storage portion 83 to the external devices. Accordingly, the printing system 1*a* collectively manages the printing material cartridges 4 attached to and detached from the cartridge mounting portions 6 of a plurality of the printing apparatuses 10 and 10*a*, and provides various types of information of the printing material cartridge 4 and the like to the user and the external device through the terminal display portion 97 and the apparatus display portion 15.

The server apparatus 8 includes a server communication portion 85, the server storage portion 83, and a server CPU 81. The server apparatus 8 is communicatively connected to an external device such as the first printing apparatus 10, the second printing apparatus 10*a*, and the portable terminal 9 via the server communication portion 85.

The server storage portion 83 is a storage portion provided in the server apparatus 8. The server storage portion 83 includes, for example, a RAM, a ROM, and a rewritable non-volatile memory. The server storage portion 83 stores various types of data including a management table 830, a compatibility database 831, the storage location database 335, the movable threshold 332, the consumption threshold 333, and the time threshold 334.

FIG. 16 is a diagram illustrating an example of the management table 830. The management table 830 is a table in which various types of information of the printing material cartridge 4 are associated with each identification information J. In the example illustrated in FIG. 16, the cartridge ID as the identification information J of the printing material cartridge 4, the consumption value 336, the reading frequency 338, and the reading timing 339 are associated with each printing material cartridge 4. The types and values of the information included in the management table 830 are not limited thereto.

As in the present embodiment, when the plurality of printing apparatuses 10 and 10*a* are communicatively connected to the server apparatus 8 and there are a plurality of printing apparatuses 10 and 10*a* in which the printing material cartridge 4 is usable, the compatibility database 831 has, for example, the following configuration. Specifically, the compatibility database 831 is a database that stores product numbers of a plurality of different compatible models in association with each other for one type of printing material cartridge 4, which is distinguished by the model number of the printing material cartridge 4. In addition, the compatibility database 831 may be a database that stores production lot numbers of the plurality of printing apparatuses 10 and 10*a* having the same product number in association with each other for one type of printing material cartridge 4. At this time, the identification information J may include apparatus IDs assigned to the respective printing apparatuses 10 and 10*a* in order to distinguish between the plurality of printing apparatuses 10 and 10*a*, instead of the product numbers of the compatible models. In addition, for example, even in the printing material cartridges 4 accommodating the same printing material such as the same ink type, considering that unique identification information J is assigned to each of the printing material cartridges 4, a plurality of the printing material cartridges 4 may each correspond to one printing apparatus 10 as a compatible model.

The storage location database 335 is a database indicating a storage location of the printing material cartridge 4. Specifically, the storage location database 335 is, for example, a database in which the model number of the printing material cartridge 4 is associated with the storage location in a facility where the printing system 1*a* is installed. At least a portion of various types of data stored in the server storage portion 83 may be stored in the apparatus storage portion 33 of the printing apparatuses 10 and 10*a*.

The server CPU 81 functions as an information acquisition portion 811 and an information processing portion 815 by deploying various programs, data, and the like stored in the server storage portion 83. The information acquisition portion 811 acquires various types of information such as the identification information J of the printing material cartridge 4 and the consumption value 336 via the server communication portion 85. The information processing portion 815 updates the consumption value 336 included in the management table 830 stored in the server storage portion 83 based on the consumption value 336 calculated by the consumption value calculation portion 314 of the printing apparatuses 10 and 10*a*. Furthermore, the information processing portion 815 estimates whether or not a specific printing material cartridge 4 is a replacement target, with reference to the management table 830 stored in the server storage portion 83. Then, the information processing portion 815 causes the apparatus display portion 15 of the printing apparatuses 10 and 10*a* and the terminal display portion 97 of the portable terminal 9 to display an estimation result. At least a portion of the functions of the apparatus CPU 31 may be performed by the server CPU 81. In addition, at least a portion of the functions of the server CPU 81 may be performed by the apparatus CPU 31.

B-2. Cooperation between Printing System and Portable Terminal:

When the terminal reading portion 95 reads the identification portion 45, the terminal acquisition portion 913 acquires the identification information J and refers to the compatibility database 831 stored in the server storage portion 83. Then, the display control portion 915 can cause the terminal display portion 97 to display the plurality of printing apparatuses 10 and 10*a* in which the printing material cartridge 4 is usable by comparing the identification information J acquired via the terminal reading portion 95 to the compatibility database 831 stored in the server storage portion 83. Specifically, the display control portion 915 extracts, for example, a model number of the printing material cartridge 4 that matches the model number of the printing material cartridge 4 included in the acquired identification information J from the compatibility database 831. The display control portion 915 causes the terminal display portion 97 to display the printing apparatuses 10 and 10*a* having the product number of the compatible model corresponding to the extracted model number of the printing material cartridge 4 in the compatibility database 831 as the printing apparatuses 10 and 10*a* in which the printing material cartridge 4 is usable. That is, by reading the identification portion 45 with the portable terminal 9, the terminal display portion 97 of the portable terminal 9 can display a plurality of candidates for the printing apparatuses 10 and 10*a* in which the printing material cartridge 4 is usable.

Furthermore, when the identification portion 45 of the printing material cartridge 4 determined by the information processing portion 815 that the consumption value 336 is equal to or more than the consumption threshold 333 is read by the terminal reading portion 95, the terminal acquisition portion 913 acquires the identification information J and refers to the storage location database 335. In addition, the display control portion 915 can cause the terminal display portion 97 to display the storage location of the replaceable printing material cartridge 4 by comparing the identification information J acquired via the terminal reading portion 95 to the storage location database 335 stored in the server storage portion 83. That is, by reading, with the portable terminal 9, the identification portion 45 of the printing material cartridge 4 determined by the printing apparatus 10 that the remaining amount of the printing material is equal to or less than the predetermined threshold, the storage location of the replaceable printing material cartridge 4 can be displayed on the terminal display portion 97. Accordingly, even when the printing apparatus 10 in which the printing material cartridge 4 as the replacement target is mounted and the storage location of the printing material cartridge 4 are separated from each other, the user can newly prepare the printing material cartridge 4 based on information of the terminal display portion 97 of the portable terminal 9 that is portable. Therefore, the convenience of the user who replaces the printing material cartridge 4 can be further improved. In this case, the printing material cartridge 4 in which the consumption value 336 is determined to be equal to or more than the consumption threshold 333 is considered as being used up, and the display control portion 915 may cause the terminal display portion 97 to display a disposal location. This can be achieved by storing a disposal location database in the server storage portion 83, similar to the storage location database 335.

According to the second embodiment, as illustrated in FIG. 15, the printing system 1*a* includes the plurality of printing apparatuses 10 and 10*a* and the server apparatus 8 communicatively connected to the printing apparatuses 10 and 10*a*. Accordingly, in the printing system 1*a*, the information of the printing material cartridges 4 attached to and detached from the cartridge mounting portion 6 of the plurality of printing apparatuses 10 and 10*a* can be collectively managed by the server apparatus 8. Therefore, for example, even when a specific printing material cartridge 4 is mounted in the first printing apparatus 10 and used and is then refilled with the printing material and mounted in the second printing apparatus 10*a*, the printing system 1 can appropriately manage consumption value 336, the reading frequency 338, and the reading timing 339. That is, by storing various types of information of the printing material cartridge 4 in association with the identification information J in the server storage portion 83, even when the printing material cartridge 4 is mounted in different printing apparatuses 10 and 10*a*, various types of information on the printing material cartridge 4 can be continuously managed.

In addition, according to the second embodiment, the user can check the identification information J of the printing material cartridge 4 mounted in each of the plurality of printing apparatuses 10 and 10*a* and contents of the management table 830 using the terminal display portion 97. Accordingly, the user convenience can be further improved.

The identification portion 45 may further record information regarding the server apparatus 8 such as a destination of the server apparatus 8. The destination of the server apparatus 8 is, for example, a URL for the server apparatus 8.

C. Third Embodiment

FIG. 17 is a side view of a printing material cartridge 4*a* in a third embodiment. FIG. 17 illustrates a state in which the printing material cartridge 4*a* is viewed from the cartridge first side wall 404 side. In the present embodiment, a portion of a configuration of a case 40*a* is different from that of the first embodiment illustrated in FIG. 4. Specifically, the cartridge rear wall 401 has an inclined wall 407 at a portion coupled to the cartridge upper wall 402. In this regard, a shape of an identification portion 45*a* is different from that of the first embodiment. Other configurations of the printing material cartridge 4*a* are the same as those of the first embodiment. The same configurations as those in the first embodiment will be given the same reference numerals, and descriptions thereof will be omitted.

Figure 18:
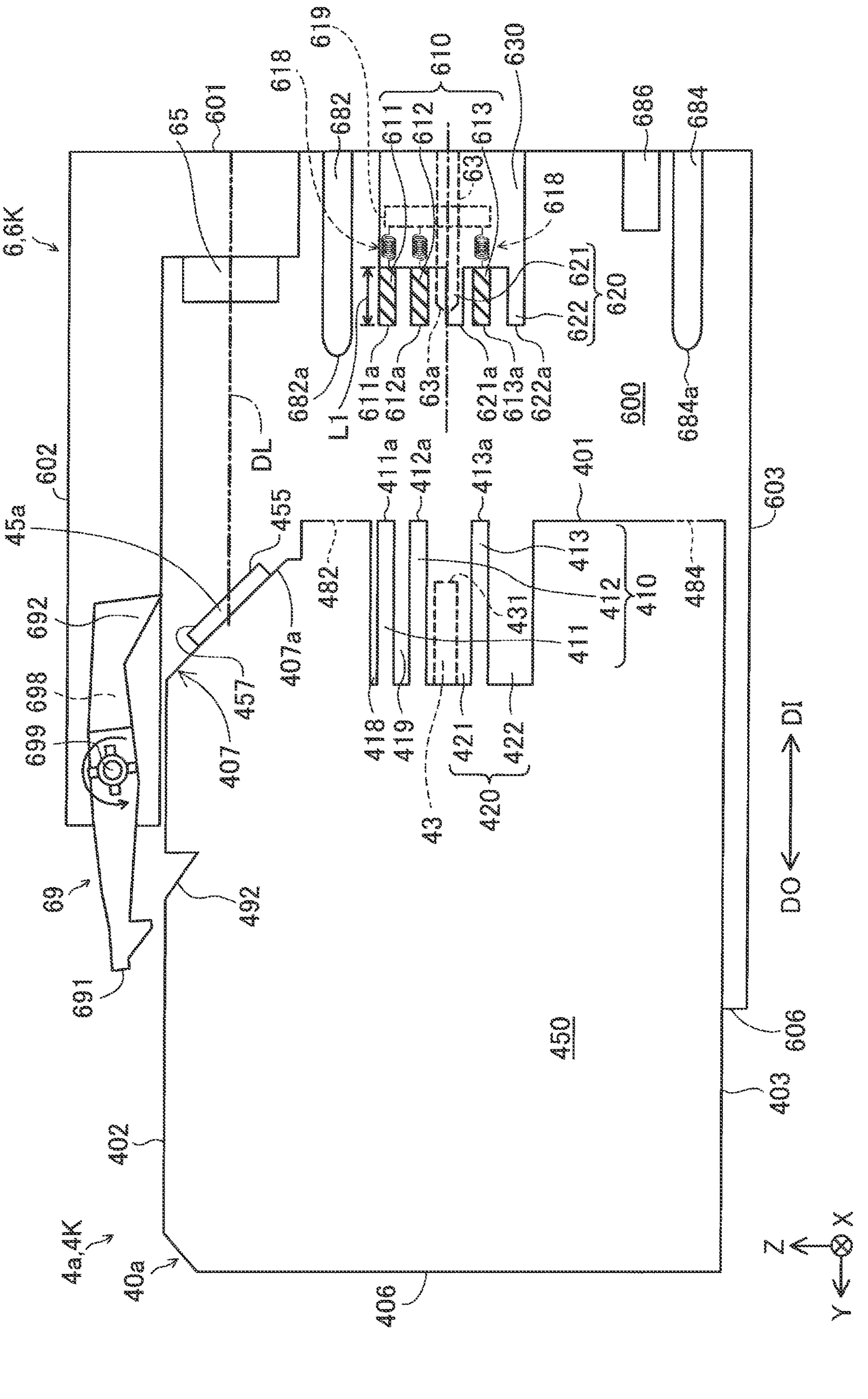
FIG. 18 is a view illustrating an insertion process of inserting the printing material cartridge into the cartridge mounting portion.

FIG. 18 is a view illustrating an insertion process of inserting the printing material cartridge 4*a* into the cartridge mounting portion 6. The inclined wall 407 is provided at a corner portion where the cartridge rear wall 401, the cartridge upper wall 402, the cartridge first side wall 404, and the cartridge second side wall 405 intersect. The inclined wall 407 is a wall of the printing material cartridge 4*a* that is inclined with respect to a first direction orthogonal to the optical axis direction DL when the apparatus reading portion 65 reads the identification portion 45*a*. Also in the present embodiment, the optical axis direction DL is the +Y direction from the apparatus reading portion 65 toward the identification portion 45*a*. In addition, in the present embodiment, the first direction is the Z direction along a height direction of the printing material cartridge 4*a*. The identification portion 45*a* is formed at the inclined surface 407*a* as an outer surface of the inclined wall 407.

Figure 19:
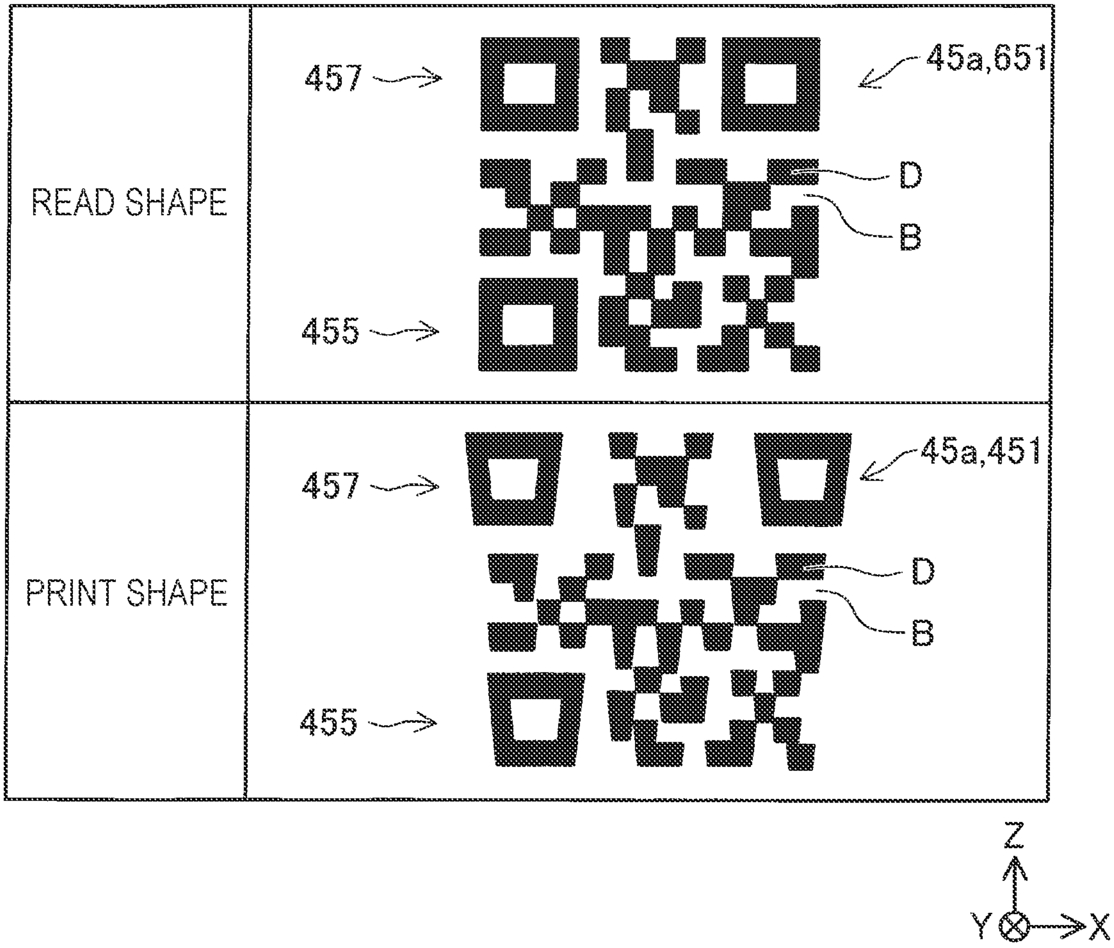
FIG. 19 is a diagram showing a read shape of an identification portion and an actual print shape of the identification portion.

FIG. 19 is a view showing a read shape 651 of the identification portion 45 and an actual print shape 451 of the identification portion 45*a*. When the identification portion 45 is formed at the inclined surface 407*a*, the read shape 651 when the apparatus reading portion 65 reads the identification portion 45*a* may not have a regular shape that can distinguish the identification information J. In this case, since the read shape 651 does not have the regular shape that can distinguish the identification information J, the apparatus reading portion 65 may not be able to read the identification portion 45*a*. Therefore, in the present embodiment, the print shape 451 of the identification portion 45*a* is changed to have the regular shape that can distinguish the identification information J when the identification portion 45*a* is read by the apparatus reading portion 65, that is, the read shape 651 has the regular shape. Specifically, shapes of each of light-colored cells B and dark-colored cells D constituting the identification portion 45*a* are shapes smaller than the regular shape in dimensions in a second direction orthogonal to the optical axis direction DL and the first direction toward a close portion 457, which is closer to the apparatus reading portion 65. In addition, the shapes of each of the light-colored cells B and the dark-colored cells D are shapes larger than the regular shape in the dimensions in the second direction toward a far portion 455, which is farther from the apparatus reading portion 65. In the present embodiment, the second direction is the X direction.

According to the third embodiment, as illustrated in FIG. 18, the identification portion 45*a* is formed at the inclined surface 407*a* of the printing material cartridge 4*a* inclined with respect to the first direction orthogonal to the optical axis direction DL when the apparatus reading portion 65 reads the identification portion 45*a*. Then, in the third embodiment, as illustrated in FIG. 19, the print shape 451 of the light-colored cells B and the dark-colored cells D may be changed to have the regular shape that can distinguish the identification information J when the identification portion 45*a* is read by the apparatus reading portion 65. In this manner, the read shape 651 can be formed into the regular shape when the identification portion 45 is formed at the inclined surface 407*a*, that is, when a formation direction of the identification portion 45*a* and the optical axis direction DL are not perpendicular to each other. Accordingly, even when the identification portion 45 is formed at the inclined surface 407*a*, the apparatus reading portion 65 can read the identification portion 45*a* and acquire the identification information J.

In addition, according to the third embodiment, when a shape of a printing material cartridge provided with a circuit substrate in the related art is a shape provided with the inclined wall 407, the printing material cartridge 4 in which the circuit substrate replaced with the identification portion 45 can be provided without changing a mold or the like of the printing material cartridge 4. Accordingly, when the configuration of the printing material cartridge 4 is changed from the configuration in the related art to the configuration according to the third embodiment, a probability that a manufacturing cost increases can be reduced.

D. Other Embodiments

D-1. Other Embodiment 1

In the above embodiments, the identification portion 45 is the QR code on which the identification information J for identifying the printing material cartridge 4 is recorded, but the identification portion 45 is not limited thereto. The identification portion 45 may be, for example, a barcode as a one-dimensional code on which the identification information J is recorded, or may be a stack type two-dimensional code. Alternatively, the identification portion 45 may be, for example, a matrix type two-dimensional code other than the QR code. Even in such a form, the identification portions 45 and 45*a* are codes in which a pattern and a shape are formed according to an arrangement pattern of a plurality of light-colored cells B and a plurality of dark-colored cells D. At this time, when the identification portion 45*a* formed of a code other than the QR code is formed at the inclined surface 407*a*, the shape of each of the light-colored cells B and the dark-colored cells D may be formed into the regular shape that can distinguish the identification information J when the identification portion 45*a* is read by the apparatus reading portion 65. Even in such a form, the apparatus reading portion 65 can read the identification portions 45 and 45*a*.

D-2. Other Embodiment 2

In the above embodiments, the identification portions 45 and 45*a* are formed at the printing material cartridge 4 by laser printing, but the identification portions 45 and 45*a* are not limited thereto. For example, the identification portions 45 and 45*a* may be formed integrally with the printing material cartridges 4 and 4*a* by printing the identification portions 45 and 45*a* on a label having printable dimensions in advance and attaching the label to the outer covering of the printing material cartridges 4 and 4*a*. Even in such a form, the identification portions 45 and 45*a* can be replaced by printed labels without attaching the circuit substrate on which the identification information or the like is recorded to the outer covering of the printing material cartridges 4 and 4*a*. Accordingly, the used printing material cartridge 4 can be reused without requiring the work of removing the circuit substrate. In addition, in this aspect, since it is not necessary to print the entire identification information J on the label, a size of the label to be attached to the printing material cartridges 4 and 4*a* can be reduced. Accordingly, when the used printing material cartridges 4 and 4*a* are reused, the amount of work required for the work of removing the label can be reduced. In addition, in this aspect, when the printing material cartridges 4 and 4*a* are reused, by attaching the label on which new identification portions 45 and 45*a* are printed so as to cover the existing label, the identification portions 45 and 45a can be changed without removing the label. Accordingly, the printing material cartridges 4 and 4a can be easily reused.

D-3. Other Embodiment 3

In the first embodiment, as illustrated in FIG. 5, the cartridge-side engagement portion 420, the supply port 431, and the identification portion 45 are all formed at the cartridge rear wall 401, but the cartridge-side engagement portion 420, the supply port 431, and the identification portion 45 are not limited thereto. The supply port 431 may be formed in, for example, a surface different from the formation surface at which the cartridge-side engagement portion 420 and the identification portion 45 are formed, in each of the walls 401 to 406 forming the outer covering of the printing material cartridge 4. For example, when the cartridge-side engagement portion 420 and the identification portion 45 are formed at the cartridge rear wall 401, the supply port 431 may be formed in the cartridge bottom wall 403. In this case, the disposition hole 434 is formed in the cartridge bottom wall 403. Even in such a form, it is possible to determine whether or not the correct printing material cartridge 4 that is compatible with the cartridge mounting portion 6 is inserted by the presence or absence of engagement between the cartridge-side engagement portion 420 and the apparatus-side engagement portion 620 and the identification information J obtained by reading the identification portion 45 with the apparatus reading portion 65.

D-4. Other Embodiment 4

In the above embodiments, the printing apparatuses 10 and 10a are ink jet printers that discharge ink as the printing material, but the printing apparatuses 10 and 10a are not limited thereto. The printing apparatuses 10 and 10a may be, for example, printers that perform printing using a powder such as toner as the printing material. In this case, the printing material cartridges 4 and 4a are toner cartridges that accommodate the powder as the printing material.

D-5. Other Embodiment 5

In the above embodiments, the printing material cartridges 4 and 4a accommodate the printing material to be supplied to the printing apparatuses 10 and 10a for printing, but the printing material cartridges 4 and 4a are not limited thereto. The printing material cartridges 4 and 4a may be used for the purpose of recovering and accommodating the printing material that has been discharged from the printing apparatuses 10 and 10a and has not been used, rather than for the purpose of accommodating the printing material to be supplied to the printing apparatuses 10 and 10a for printing. In this case, the printing material cartridges 4 and 4a may be, for example, waste liquid tanks that recover ink as the printing material that has not been used for printing due to a cleaning operation of the head 22 or the like.

D-6. Other Embodiment 6

In the above embodiments, the printing systems 1 and 1a manage the remaining amount of the printing material accommodated in the printing material accommodation portion 450 by using the consumption value 336 indicating the discharge amount of the printing material. However, the present disclosure is not limited thereto. The printing systems 1 and 1a may manage the remaining amount of the printing material accommodated in the printing material accommodation portion 450 by using, for example, an output value of a photo sensor such as a prism sensor that optically detects the remaining amount of the printing material accommodated in the printing material accommodation portion 450. In addition, the printing systems 11a may manage the remaining amount of the printing material accommodated in the printing material accommodation portion 450 by using, for example, an output value of a piezoelectric sensor provided with a piezoelectric element.

D-7. Other Embodiment 7

In the above embodiments, as illustrated in FIG. 13, whether or not the printing material cartridge 4 removed from the cartridge mounting portion 6 is the replacement target is estimated. However, the present disclosure is not limited thereto. Whether or not the printing material cartridge 4 is the replacement target may be estimated in a state of being mounted in the cartridge mounting portion 6. In this case, the information processing portions 315 and 815 refer to, for example, the identification information J and the reading timing 339 stored in the storage portions 33 and 83. Then, for example, when an elapsed time from the reading timing 339 to the current time is equal to or longer than the predetermined time threshold 334, the information processing portions 315 and 815 estimate the printing material cartridge 4 as the replacement target. In this aspect, it is possible to estimate whether or not the printing material cartridge 4 mounted in the cartridge mounting portion 6 is the replacement target, and to notify the user. In addition, for example, when the elapsed time is shorter than the time threshold 334 and a difference between the elapsed time and the time threshold 334 is equal to or shorter than a predetermined time, the information processing portions 315 and 815 may cause the apparatus display portion 15 to display a message to the effect that the printing material cartridge 4 approaches the replacement time. In addition, for example, when the printing system 1 is used at a normal frequency of use, the information processing portions 315 and 815 may cause the apparatus display portion 15 to display an estimated time and an estimated replacement time until the printing material cartridge 4 reaches the replacement time. Accordingly, it is possible to prevent printing quality of the printing material cartridge 4 from being impaired.

D-8. Other Embodiment 8

In the above embodiments, as illustrated in FIG. 6, the printing material introduction portion 63 extends toward the +Y direction side beyond the apparatus-side engagement portion 620. That is, the tip end portion 63a of the printing material introduction portion 63 is positioned on the +Y direction side with respect to the tip end portions 621a and 622a of the apparatus-side engagement portion 620. However, the present disclosure is not limited thereto. For example, the printing material introduction portion 63 may be formed in the cartridge mounting portion 6 so that the tip end portion 63a of the printing material introduction portion 63 is positioned on the −Y direction side with respect to the tip end portions 621a and 622a of the apparatus-side engagement portion 620. In this aspect, the apparatus-side engagement portion 620 and the cartridge-side engagement portion 420 can be engaged with each other before the printing material introduction portion 63 and the printing material supply portion 43 are coupled to each other. Accordingly, before the printing material introduction portion 63 and the printing material supply portion 43 are coupled to each other, it is possible to determine whether or not the printing material cartridge 4 inserted into the accommodation chamber 600 of the cartridge mounting portion 6 is the correct printing material cartridge that is compatible with the cartridge mounting portion 6. Therefore, the probability that an erroneous type of printing material is supplied to the printing material introduction portion 63 can be further reduced.

D-9. Other Embodiment 9

In the above embodiments, display contents displayed on the terminal display portion 97 of the portable terminal 9 may be displayed on the apparatus display portion 15 of the printing apparatuses 10 and 10*a*. In addition, in the above embodiments, display contents displayed on the apparatus display portion 15 may be displayed on the terminal display portion 97.

E. Other Aspects

The present disclosure is not limited to the above-described embodiments, and can be realized in various configurations within the scope not departing from the concept of the present disclosure. For example, technical features in the embodiments corresponding to technical features in respective aspects described in SUMMARY of the present disclosure can be replaced or combined as appropriate in order to solve some or all of the above-described problems or to achieve some or all of the above-described effects. In addition, when the technical features are not described as essential in the present specification, the technical features can be appropriately deleted.

(1) According to an aspect of the present disclosure, there is provided a printing material cartridge. The printing material cartridge mounted by being inserted into a cartridge mounting portion of a printing apparatus, includes: an identification portion on which identification information for identifying the printing material cartridge is recorded, in which the identification portion is formed at a readable position that is optically readable by a reading portion formed inside the cartridge mounting portion of the printing apparatus in an insertion process of inserting the printing material cartridge into the cartridge mounting portion. According to this aspect, in the insertion process of inserting the printing material cartridge into the cartridge mounting portion, the identification portion on which the identification information of the printing material cartridge is recorded is optically read by the reading portion formed inside the cartridge mounting portion such that the identification information can be acquired. In this manner, a circuit substrate on which the identification information is recorded can be replaced by the identification portion on which the identification information is recorded, without attaching the circuit substrate to an outer covering of the printing material cartridge. Accordingly, the used printing material cartridge can be reused without requiring a work of removing the circuit substrate from the printing material cartridge.

(2) In the above aspect, the identification portion may be formed at the printing material cartridge by laser printing. According to this aspect, the identification portion can be formed at the printing material cartridge by laser printing. In this manner, the identification portion can be formed at the printing material cartridge without attaching a label or the like on which the identification portion is printed to the outer covering of the printing material cartridge. Accordingly, the used printing material cartridge can be reused without requiring a work of removing the label from the printing material cartridge. Therefore, the printing material cartridge can be easily reused.

(3) In the above aspect, the readable position may be a position facing the reading portion in an optical axis direction when the reading portion reads the identification portion in the insertion process. According to this aspect, the identification portion is disposed at the position facing the reading portion in the optical axis direction in the insertion process of inserting the printing material cartridge into the cartridge mounting portion. In this manner, the reading portion can read the identification portion from a front surface. Accordingly, since the reading portion can more reliably read the identification portion, it is possible to improve a reading accuracy of the identification portion.

(4) In the above aspect, a cartridge-side engagement portion that is engaged with an apparatus-side engagement portion of the cartridge mounting portion, and a formation surface at which the cartridge-side engagement portion is formed may be further included, in which the identification portion may be formed at the formation surface. According to this aspect, it is possible to determine whether or not the printing material cartridge is compatible with the cartridge mounting portion by the presence or absence of engagement between the cartridge-side engagement portion and the apparatus-side engagement portion, and the identification information, in the insertion process of inserting the printing material cartridge into the cartridge mounting portion. Accordingly, a probability that the printing material cartridge that is not compatible with the cartridge mounting portion is mounted can be reduced.

(5) In the above aspect, the formation surface may be a surface that faces the reading portion in an optical axis direction when the reading portion reads the identification portion in the insertion process, and is orthogonal to the optical axis direction. According to this aspect, the cartridge-side engagement portion and the apparatus-side engagement portion can be engaged with each other in a state in which the reading portion can read the identification portion from the front surface. Accordingly, the probability that the printing material cartridge that is not compatible with the cartridge mounting portion is mounted can be further reduced.

(6) In the above aspect, a supply port that supplies a printing material to the printing apparatus may be further included, in which the supply port may be formed at the formation surface. According to this aspect, in the state in which the reading portion can read the identification portion from the front surface, that is, in a state in which the reading accuracy of the identification portion is improved, the printing material can be supplied from the supply port to a printing apparatus side. Accordingly, it is possible to reduce a probability that different types of printing materials are mixed.

(7) In the above aspect, the identification portion may be a code in which a pattern and a shape are formed according to an arrangement pattern of a plurality of light-colored cells and a plurality of dark-colored cells, and may be formed at an inclined surface of the printing material cartridge inclined with respect to a first direction orthogonal to an optical axis direction when the reading portion reads the identification portion, and shapes of the light-colored cells and the dark-colored cells may be shapes that are smaller than a regular shape in dimensions in a second direction orthogonal to the optical axis direction and the first direction toward a portion closer to the reading portion and are larger than the regular shape in the dimensions in the second direction toward a portion farther from the reading portion so that the identification portion has the regular shape with which the identification information is identifiable when the identification portion is read by the reading portion. According to this aspect, even when the identification portion is formed at the inclined surface inclined with respect to the first direction orthogonal to the optical axis direction, a read shape when the identification portion is read by the reading portion can have the regular shape.

(8) According to another aspect of the present disclosure, there is provided a printing system. The printing system includes: the printing material cartridge according to the above aspect; and a printing apparatus, in which the printing apparatus includes a cartridge mounting portion in which the printing material cartridge is mounted by inserting the printing material cartridge, and a notification portion that notifies that mounting of the printing material cartridge in the cartridge mounting portion is completed, the printing material cartridge has a protruding portion extending in an insertion direction of the printing material cartridge with respect to the cartridge mounting portion, the cartridge mounting portion has a movable portion, the movable portion is pushed by the protruding portion in the insertion process, and the notification portion notifies that the mounting of the printing material cartridge in the cartridge mounting portion is completed when a movement amount of the movable portion is equal to or more than a predetermined threshold. According to this aspect, the printing system can notify a user that the mounting of the printing material cartridge in the cartridge mounting portion is completed. Accordingly, the user can be given a sense of relief.

(9) In the above aspect, the cartridge mounting portion may further include an apparatus-side engagement portion, the movable portion may be positioned in a formation region of the apparatus-side engagement portion, the printing material cartridge may further include a cartridge-side engagement portion that is engaged with the apparatus-side engagement portion, and the protruding portion may be positioned in a formation region of the cartridge-side engagement portion. According to this aspect, the printing system can notify that mounting of the printing material cartridge that is compatible with the cartridge mounting portion is completed by the presence or absence of engagement between the cartridge-side engagement portion and the apparatus-side engagement portion and the movement amount of the movable portion.

Not all of a plurality of components of each aspect of the present disclosure described above are essential. Some of the plurality of components can be changed, deleted, or replaced with new other components as appropriate and some of limitations can be deleted in order to solve some or all of the above-described problems or to achieve some or all of the effects described in the present specification. In addition, in order to solve some or all of the above-described problems or to achieve some or all of the effects described in the present specification, some or all of technical features included in one aspect of the present disclosure described above can be combined with some or all of technical features included in another aspect of the present disclosure described above to form an independent aspect of the present disclosure.

The present disclosure can also be realized in various aspects other than the printing material cartridge and the printing system. For example, the present disclosure can be realized in aspects such as a method of manufacturing a printing material cartridge, a method of manufacturing a printing system, a method of controlling a printing system, a computer program that realizes the controlling method, and a non-temporary recording medium on which the computer program is recorded.

What is claimed is:

1. A printing material cartridge mounted by being inserted into a cartridge mounting portion of a printing apparatus, the printing material cartridge comprising:

an identification portion on which identification information for identifying the printing material cartridge is recorded, wherein the identification portion is at a readable position that is optically readable by a reading portion inside the cartridge mounting portion of the printing apparatus when the identification portion is moved within a predetermined distance of the reading portion during an insertion process of inserting the printing material cartridge into the cartridge mounting portion, and the predetermined distance is prior to the printing material cartridge being in a mounted state within the cartridge mounting portion.

2. The printing material cartridge according to claim 1, wherein the identification portion is formed at the printing material cartridge by laser printing.

3. The printing material cartridge according to claim 1, wherein the readable position faces the reading portion in an optical axis direction when the reading portion reads the identification portion in the insertion process.

4. The printing material cartridge according to claim 1, further comprising:

a cartridge-side engagement portion that is engaged with an apparatus-side engagement portion of the cartridge mounting portion; and a formation surface at which the cartridge-side engagement portion, wherein the identification portion is at the formation surface.

5. The printing material cartridge according to claim 4, wherein the formation surface faces the reading portion in an optical axis direction when the reading portion reads the identification portion in the insertion process, and is orthogonal to the optical axis direction.

6. The printing material cartridge according to claim 4, further comprising:

a supply port that supplies a printing material to the printing apparatus, wherein the supply port is at the formation surface.

7. The printing material cartridge according to claim 1, wherein the identification portion is a code in which a pattern and a shape are formed according to an arrangement pattern of a plurality of light-colored cells and a plurality of dark-colored cells, and is at an inclined surface of the printing material cartridge inclined with respect to a first direction orthogonal to an optical axis direction when the reading portion reads the identification portion, and shapes of the light-colored cells and the dark-colored cells are smaller than a regular shape in dimensions in a second direction orthogonal to the optical axis direction and the first direction toward a portion closer to the reading portion and are larger than the regular shape in the dimensions in the second direction toward a portion farther from the reading portion so that the identification portion has the regular shape with which the identification information is identifiable when the identification portion is read by the reading portion.

8. A printing system comprising:

the printing material cartridge according to claim 1; and a printing apparatus, wherein the printing apparatus includes a cartridge mounting portion in which the printing material cartridge is mounted by inserting the printing material cartridge, and a notification portion that notifies that mounting of the printing material cartridge in the cartridge mounting portion is completed, the printing material cartridge has a protruding portion extending in an insertion direction of the printing material cartridge with respect to the cartridge mounting portion, the cartridge mounting portion has a movable portion, the movable portion is pushed by the protruding portion in the insertion process, and the notification portion notifies that the mounting of the printing material cartridge in the cartridge mounting portion is completed when a movement amount of the movable portion is equal to or more than a predetermined threshold.

9. The printing system according to claim 8, wherein the cartridge mounting portion further includes an apparatus-side engagement portion, the movable portion is in a formation region of the apparatus-side engagement portion, the printing material cartridge further includes a cartridge-side engagement portion that is engaged with the apparatus-side engagement portion, and the protruding portion is in a formation region of the cartridge-side engagement portion.

* * * * *